United States Patent
Yamazaki

(10) Patent No.: US 10,128,937 B2
(45) Date of Patent: Nov. 13, 2018

(54) DATA MANAGEMENT METHOD AND DATA MANAGEMENT SYSTEM

(71) Applicant: FUJITSU LIMITED, Kawasaki-shi, Kanagawa (JP)

(72) Inventor: Masanori Yamazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 159 days.

(21) Appl. No.: 15/426,594

(22) Filed: Feb. 7, 2017

(65) Prior Publication Data
US 2017/0264358 A1  Sep. 14, 2017

(30) Foreign Application Priority Data
Mar. 9, 2016 (JP) ................. 2016-046328

(51) Int. Cl.
H04B 7/155 (2006.01)
H04W 76/11 (2018.01)
H04W 60/00 (2009.01)
H04W 36/00 (2009.01)
H04W 88/16 (2009.01)
(Continued)

(52) U.S. Cl.
CPC .... *H04B 7/15507* (2013.01); *H04W 36/0016* (2013.01); *H04W 60/00* (2013.01); *H04W 76/11* (2018.02); *H04W 4/70* (2018.02); *H04W 36/245* (2013.01); *H04W 88/16* (2013.01)

(58) Field of Classification Search
CPC . H04L 63/0428; H04L 63/06; H04L 63/0876; H04L 63/10; H04L 67/02; H04L 67/146; H04L 67/20; H04L 67/306; H04W 12/08
See application file for complete search history.

(56) References Cited

U.S. PATENT DOCUMENTS 9,609,484 B1* 3/2017 Rodoper ............... H04W 4/029
2004/0189816 A1* 9/2004 Nakazawa ............ H04N 7/181
348/211.2
(Continued)

FOREIGN PATENT DOCUMENTS

JP 2004-362267 12/2004
JP 2005-123836 5/2005
JP 2014-516504 7/2014

*Primary Examiner* — Dung B Huynh
(74) *Attorney, Agent, or Firm* — Fujitsu Patent Center

(57) ABSTRACT

A management device is connected with a plurality of relay devices, and the relay devices store data collected by a device. The management device registers, when a connection notification is received from one of the relay devices, relay device identification information, which identifies the relay device, of the relay device serving as the request destination when the data is acquired, sends a data acquisition request to the specified relay device, and sends, to one of the relay devices, relay device identification information of the target relay device targeted for deletion. The plurality of the relay devices associates, when the identification information targeted for the deletion is received, inquiry destination information specifying the target relay device with the data, and performs, when the data acquisition request is received, response control of the data on the basis of the determination of whether the inquiry destination information is associated with the data.

12 Claims, 25 Drawing Sheets

(51) Int. Cl.
*H04W 36/24* (2009.01)
*H04W 4/70* (2018.01)

(56) References Cited

U.S. PATENT DOCUMENTS

| | | | |
|---|---|---|---|
| 2005/0210238 A1* | 9/2005 | Takita | H04N 21/4126 713/155 |
| 2005/0242943 A1* | 11/2005 | Matsumoto | G01D 9/005 340/521 |
| 2006/0158310 A1* | 7/2006 | Klatsmanyi | G08B 13/2462 340/10.1 |
| 2006/0190458 A1* | 8/2006 | Mishina | H04L 67/125 |
| 2008/0070614 A1* | 3/2008 | Ogushi | H04W 52/0216 455/522 |
| 2009/0240656 A1* | 9/2009 | Tanabe | H04W 4/02 |
| 2009/0296724 A1* | 12/2009 | Matsunaga | H04L 12/2818 370/401 |
| 2011/0149767 A1* | 6/2011 | Lee | H04L 29/12047 370/252 |
| 2012/0023564 A1* | 1/2012 | Tsiatsis | H04L 63/08 726/7 |
| 2012/0051260 A1* | 3/2012 | Tamaki | H04W 24/02 370/253 |
| 2012/0110054 A1* | 5/2012 | Katsuki | A61B 5/0002 709/201 |
| 2013/0110991 A1* | 5/2013 | Fujimoto | H04L 29/06333 709/220 |
| 2013/0117373 A1* | 5/2013 | Umehara | H04M 3/42374 709/204 |
| 2013/0132480 A1* | 5/2013 | Tsuji | G06Q 10/06 709/204 |
| 2013/0203442 A1* | 8/2013 | LeBlanc | G06Q 10/109 455/456.3 |
| 2014/0036728 A1 | 2/2014 | An et al. | |
| 2014/0074667 A1* | 3/2014 | Smith | G01S 5/12 705/28 |
| 2014/0113621 A1* | 4/2014 | Lerenius | H04W 48/16 455/426.1 |
| 2014/0140300 A1* | 5/2014 | Barrett | H04W 4/14 370/329 |
| 2014/0198713 A1* | 7/2014 | Park | H04L 67/06 370/315 |
| 2015/0103776 A1* | 4/2015 | Luther | H04L 61/2038 370/329 |
| 2015/0123794 A1* | 5/2015 | Hamalainen | G07C 9/00111 340/539.13 |
| 2015/0141005 A1* | 5/2015 | Suryavanshi | H04L 67/125 455/434 |
| 2016/0135242 A1* | 5/2016 | Hampel | H04W 40/02 370/329 |
| 2016/0316313 A1* | 10/2016 | Yang | H04W 4/70 |
| 2017/0006435 A1* | 1/2017 | Yamamoto | H04W 4/70 |
| 2017/0063939 A1* | 3/2017 | Miyamoto | H04L 65/1046 |
| 2018/0067995 A1* | 3/2018 | Ishii | G06F 17/30551 |

\* cited by examiner

FIG.4

DEVICE ID: A ---- 1000

| GW ID | TIME STAMP | Nu | ... |
|---|---|---|---|
| GW1 | 9:31 | 10 | | ---- 1001
| GW2 | 9:43 | 23 | | ---- 1002
| GW7 | 10:02 | 5 | | ---- 1003
| GW6 | 10:14 | 16 | |
| GW9 | 10:22 | 20 | |

FIG.5

DEVICE ID: A

| GW ID | TIME STAMP | Nu | ... |
|---|---|---|---|
| GW2 | 9:43 | 23 | | ---- 1002
| GW6 | 10:14 | 16 | |
| GW9 | 10:22 | 20 | |

FIG.6

| DEVICE ID | TIME STAMP | SENSOR DATA | B POINTER | F POINTER | Np | ... |
|---|---|---|---|---|---|---|
| C | 9:40 | 24.3°C | | | - | |
| A | 9:43 | 24.1°C | GW1 | | 5 | |
| ... | | | | | | |
| A | 9:59 | 25.1°C | | GW7 | 0 | |
| ... | | | | | | |

FIG.7

| DEVICE ID | TIME STAMP | SENSOR DATA | B POINTER | F POINTER | Np | ... |
|---|---|---|---|---|---|---|
| A | 10:02 | ... | GW2 | GW6 | ... | |
| ... | | | | | | |

FIG.8

| DEVICE ID | TIME STAMP | SENSOR DATA | B POINTER | F POINTER | Np | ... |
|---|---|---|---|---|---|---|
| A | 9:31 | 24.3°C | | | - | |
| A | 9:33 | 24.4°C | | | - | |
| ... | | | | | | |
| B | 9:33 | 24.1°C | | | - | |
| A | 9:41 | 25.1°C | | GW2 | 7 | |
| ... | | | | | | |

FIG.21

DEVICE ID: A

| DEVICE DATA ID | GW ID | TIME STAMP | Nu | ... |
|---|---|---|---|---|
| 3 | GW1 | 9:31 | 10 | |
| 6 | GW2 | 9:43 | 23 | |
| ... | GW7 | 10:02 | 5 | |
| ... | GW6 | 10:14 | 16 | |
| ... | GW9 | 10:22 | 20 | |

4000 — DEVICE DATA ID
4001 —

FIG.22

| DEVICE DATA ID | GW ID | POINTER TYPE | Np | ... |
|---|---|---|---|---|
| 3 | GW1 | F POINTER | 7 | |
| 6 | GW2 | B POINTER | 5 | |
| ... | | | | |

| DEVICE DATA ID | DEVICE ID | TIME STAMP | SENSOR DATA | B POINTER | F POINTER | ... |
|---|---|---|---|---|---|---|
| 1 | C | 9:40 | 24.3°C | | | |
| ... | | | | | | |
| 6 | A | 9:43 | 24.1°C | GW1 | | |
| | ... | | | | | |
| | A | 9:59 | 25.1°C | | GW7 | |
| | ... | | | | | |

4201

DATA MANAGEMENT METHOD AND DATA MANAGEMENT SYSTEM

CROSS-REFERENCE TO RELATED APPLICATION

This application is based upon and claims the benefit of priority of the prior Japanese Patent Application No. 2016-046328, filed on Mar. 9, 2016, the entire contents of which are incorporated herein by reference.

FIELD

The embodiments discussed herein are related to a data management method and a data management system.

BACKGROUND

In recent years, studies have been conducted on the technology that is called the Internet of things (IoT) and that performs management control by connecting objects, such as home appliances, or the like, to the Internet. As a specific example, there is a known technology in which a sensor included in a device mounted on an automobile or the like measures data, such as temperatures or the like and automatically sends the measured sensor data to a predetermined server device or the like via the Internet.

There is a known service that provides by using this technology by, for example, a service provider the sent sensor data in accordance with a request from a user. For example, if a service user requests sensor data from the server device after specifying the position and the time via a terminal, the server device extracts the target data corresponding to the request from among the pieces of sensor data that are acquired by the devices and provides the extracted data to the terminal. Furthermore, there is also a known technology in which, instead of directly receiving sensor data from each of the devices by a server device, gateways receive the sensor data from each of the devices and provides the received sensor data to the server device.

By the way, examples of the devices connected to the Internet in IoT include mobile terminals, such as smartphones, and movable devices, such as automobiles, or the like. For example, there may sometimes be a case in which, a device is moved after having sent sensor data to a gateway and, consequently, the device sends the sensor data to another gateway located at the move destination. Namely, it is conceivable that the gateway that acquires sensor data measured by a single device differs in accordance with the measurement time. In this case, the server device sends, for example, a request for the sensor data acquired from the subject device to all of the gateways and receives the sensor data from the gateway that has acquired the subject sensor.

In addition, there is also a known technology that holds, in a server device, the move history that indicates that each of the devices sends sensor data to which of gateways at what time point. In this technology, when the server device acquires the sensor data requested by a user, the server device specifies, on the basis of the move history, the gateway that acquires, from the device, the sensor data requested by the user. Then, the server device sends, to the specified gateway, a request for the requested sensor data. Because the server device holds the move history, it is possible to keep a response speed due to a request transmission; however, there is a need to secure the storage capacity for holding the move history.

Patent Document 1: Japanese Laid-open Patent Publication No. 2004-362267
Patent Document 2: Japanese Laid-open Patent Publication No. 2005-123836
Patent Document 3: Japanese National Publication of International Patent Application No. 2014-516504

However, there is the trade-off relationship between keeping a response speed due to holding the move history and reduction in the capacity of the storage device due to deletion of the move history and thus it is difficult to appropriately control the capacity of the move history.

For example, when data is collected from a plurality of gateways, if all of the move histories of each of the devices are held in the server device, an amount of data of the move history is unlimitedly increased as the time has elapsed and there may sometimes be a case in which the capacity of the storage device in the server device is suppressed. In contrast, if the move history is not held or if some data in the move history is deleted, the number of requests sent from the server device to the gateways or the number of requests sent from the requested gateway to the other gateways is increased. Consequently, there may sometimes be a case of a decrease in a response speed with respect to a request for data acquisition.

SUMMARY

According to an aspect of an embodiment, a management device registers, in a storage when a connection notification is received from a relay device, from among a plurality of relay devices, that is connected to a device that collects data, identification information that identifies the relay device serving as the request destination when the data is acquired; sends, when the data is acquired, an acquisition request for the data to the relay device specified by the identification information; and sends, to one of the relay devices, identification information targeted for deletion from among the plurality of pieces of the identification information associated with the plurality of the relay devices. The plurality of the relay devices stores the data collected by the device in the storage; registers, in the storage when the identification information targeted for the deletion is received, inquiry destination information that specifies the relay device targeted for the deletion by associating the inquiry destination information with the data, and performs, when the acquisition request for the data is received from the management device, response control of the data on the basis of the determination of whether the inquiry destination information is associated with the data in the storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of a move history DB included in a center;

FIG. 5 is a schematic diagram illustrating another example of the move history DB included in the center;

FIG. 6 is a schematic diagram illustrating an example of a device information DB related to GW2;

FIG. 7 is a schematic diagram illustrating an example of the device information DB related to GW7;

FIG. 8 is a schematic diagram illustrating an example of the device information DB related to GW1;

FIG. 21 is a schematic diagram illustrating an example of a move history DB included in a center according to a third embodiment;

FIG. 22 is a schematic diagram illustrating an example of a pointer use frequency DB included in the center according to the third embodiment;

FIG. 23 is a schematic diagram illustrating an example of a device information DB related to GW2 according to the third embodiment;

DESCRIPTION OF EMBODIMENTS

Preferred embodiments of the present invention will be explained with reference to accompanying drawings. Furthermore, the present invention is not limited to the embodiments. Furthermore, the embodiments described below may also appropriately be used in combination as long as processes do not conflict with each other.

[a] First Embodiment

Overall Configuration

Figure 1:
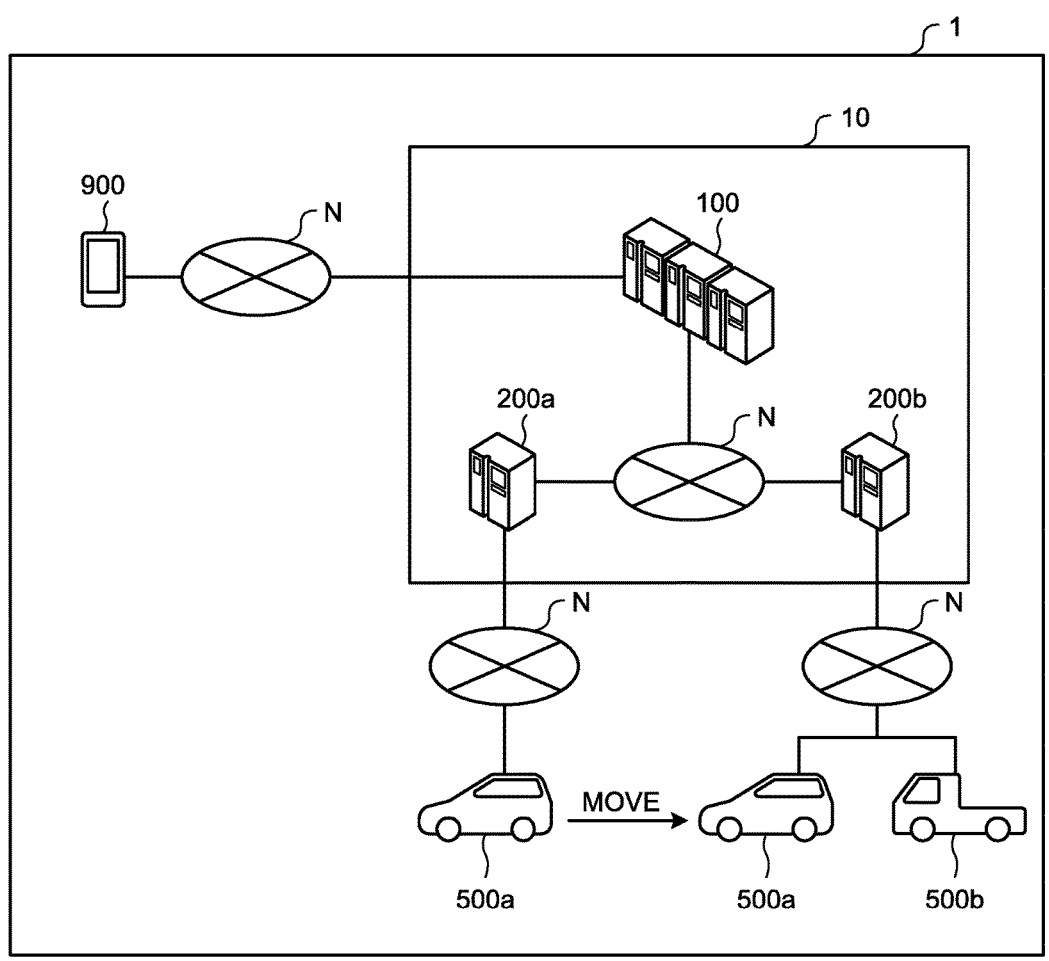
FIG. 1 is a schematic diagram illustrating an example of the system configuration.

First, an example of the system configuration that implements the present invention will be described with reference to FIG. 1. FIG. 1 is a schematic diagram illustrating an example of the system configuration. As illustrated in FIG. 1, a data acquisition system 1 according to the present invention includes a data management system 10 that includes therein, for example, a center 100 and gateways 200a and 200b. Furthermore, the data acquisition system 1 further includes devices 500a and 500b and a terminal 900 of a service user. Furthermore, each of the gateways may sometimes be referred to as a "GW" and, when the GW 200a and the GW 200b are described without distinction, the GW 200a and the GW 200b may sometimes be referred to as a "GW 200". In the embodiment, an example in which the data acquisition system 1 includes two GWs, i.e., the GW 200a and the GW 200b, is used; however, the embodiment is not limited to this and the data acquisition system 1 may also have three or more GWs. Furthermore, the center 100 is an example of a management device and the GW 200 is an example of a relay device.

Furthermore, unique identification information is attached to each of the GWs 200. The center 100 and each of the GWs 200 specify each of the GWs 200 by using the unique identification information. For example, in the example illustrated in FIG. 1, the identification information on the GW 200a may sometimes be referred to as a "GW1" and the identification information on the GW 200b may sometimes be referred to as a "GW2". Furthermore, the identification information on the GW 200 may sometimes be referred to as the "GW ID".

The center 100 and the GWs 200a and 200b are implemented by apparatuses, such as computers or the like, and are connected via a network N such that the devices can communicate with each other. Any kind of communication network, such as the Internet, a local area network (LAN), a virtual private network (VPN), or the like, may be used as the network N irrespective of whether the network is a wired or wireless connection.

In the data acquisition system 1 illustrated in FIG. 1, the center 100 is connected to the terminal 900 of the service user via the network N such that the center 100 and the terminal 900 can communicate with each other. When the center 100 receives a data acquisition request from the terminal 900 of the service user, the center 100 acquires the sensor data from the GW 200 and provides the acquired sensor data to the terminal 900 of the service user.

The terminal 900 of the service user is an apparatus, such as a smartphone, or the like, that has a communication function; however the terminal 900 is not limited to this and may also be a stationary-type apparatus, such as a desktop computer, or the like. Furthermore, the terminal 900 of the service user may sometimes be referred to as the user terminal 900. In the embodiment, an example in which the center 100 is connected to the single user terminal 900 is used; however, the embodiment is not limited to this and the center 100 may also be connected to a plurality of the user terminals 900.

The devices 500a and 500b are connected to the GW 200a and the GW 200b, respectively, via the network N, so as to communicate with each other. The devices 500a and 500b are apparatuses that are mounted on, for example, automobiles or the like; that have a sensor function; and that can be moved; however, the devices 500a and 500b are not limited to these apparatuses but may also be implemented by apparatuses, such as smartphones or the like. Furthermore, when the device 500*a* and the device 500*b* are described without distinction, the device 500*a* and the device 500*b* may sometimes be referred to as a "device 500".

Furthermore, unique device identification information is attached to each of the devices 500. The center 100 and each of the GWs 200 specify each of the devices 500 by using the unique device identification information. For example, in the example illustrated in FIG. 1, the device identification information on the device 500*a* may sometimes be referred to as "A" and the device identification information on the device 500*b* may sometimes be referred to as "B". Furthermore, the device identification information may sometimes be referred to as the "device ID".

The GWs 200 acquire sensor data from the respective devices 500 and provide the acquired sensor data in accordance with a request from the center 100. The GW 200 associates the sensor data with both the device ID of the device 500 from which the sensor data has been acquired and the time stamp that indicates the time at which the sensor data is acquired and then sends the associated data to the center 100. In a description below, the time stamp may sometimes be referred to as "TS" and, furthermore, a combination of the acquired sensor data and a set of the associated device ID and TS may sometimes be referred to as "device data".

In the embodiment, the GWs 200*a* and 200*b* are arranged at the location, for example, separated each other and each acquire the sensor data from the devices 500 that are located in different areas. Furthermore, the device 500 according to the embodiment is moved after having sent sensor data to the specific GW 200 and then sends the sensor data to the GW 200 that is located at the move destination. For example, the device 500*a* is moved after having sent the sensor data to the GW 200*a* and sends the sensor data to the GW 200*b* located at the move destination. In the embodiment, a description will be given of an example in which the GWs 200 acquire the sensor data from the two devices, i.e., the device 500*a* and the device 500*b*; however, the example is not limited to this. For example, the configuration in which the GWs 200 acquire the sensor data from the single device 500 may also be used and the configuration in which the GWs 200 acquires the sensor data from three or more devices 500 may also be used.

Flow of a Request Process

Figure 2:
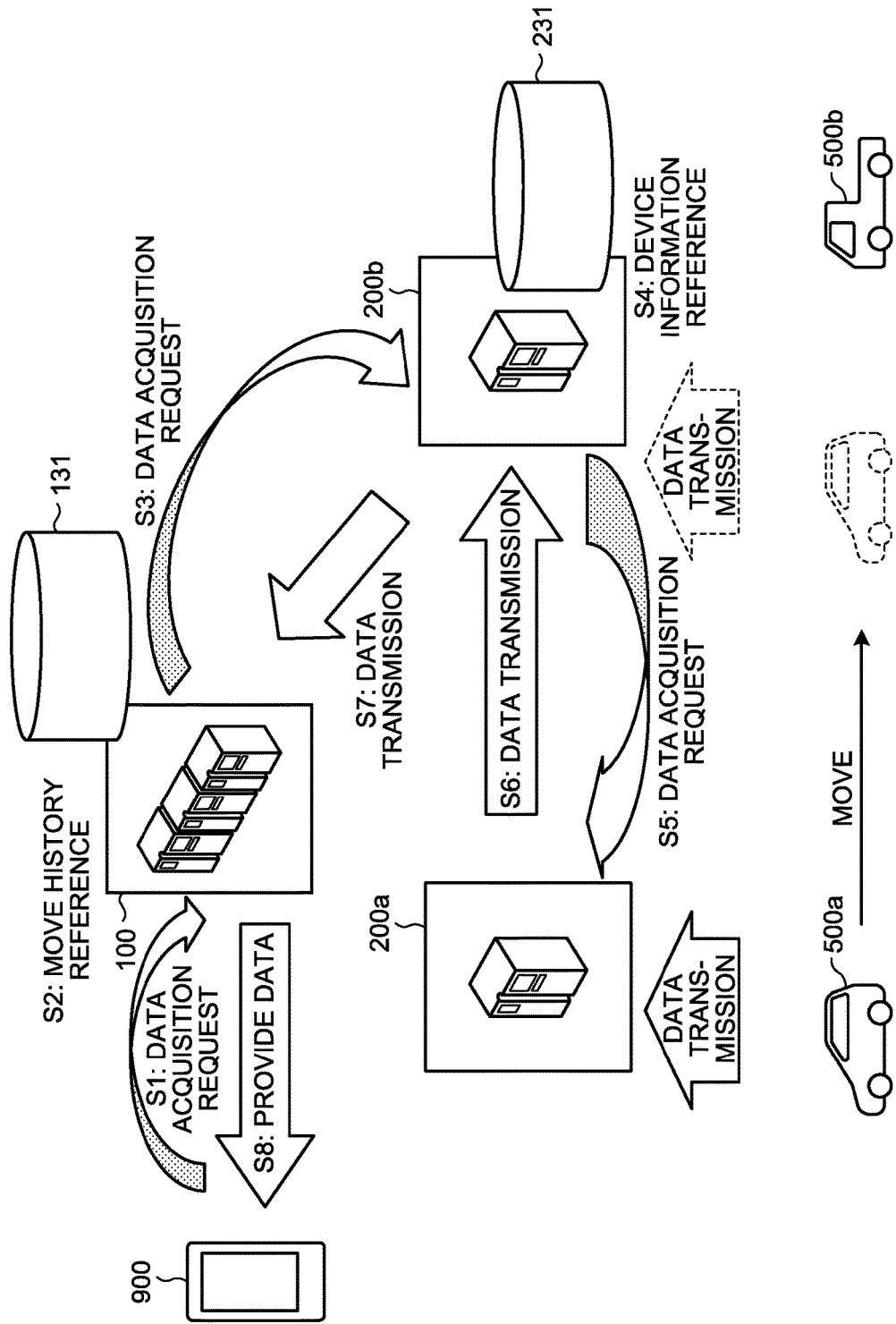
FIG. 2 is a schematic diagram illustrating an example of a data acquisition process.

In the following, an example of a process of acquiring data in accordance with a data acquisition request from a service user in the data acquisition system 1 illustrated in FIG. 1 will be described with reference to FIG. 2. FIG. 2 is a schematic diagram illustrating an example of a data acquisition process. In the example illustrated in FIG. 2, each of the GWs 200 receives the sensor data from each of the devices 500, associates the sensor data with both the device ID and TS, and stores the associated data in a device information DB 231.

First, the center 100 receives, from the user terminal 900, a data acquisition request for the sensor data collected in, for example, the device 500*a* (Step S1: data acquisition request).

Then, the center 100 refers to a move history DB 131 that stores therein, in an associated manner, the moving device 500 and the GW 200 that acquires the sensor data at the move destination of the device 500 and then specifies the GW 200 that corresponds to the transmission destination of the data acquisition request (see Step S2: move history reference). For example, the center 100 specifies, as the transmission destination of the data acquisition request, the GW 200*b* that has the GW ID of "GW2" and that has acquired the sensor data collected in the device 500*a*. In the example illustrated in FIG. 2, a description will be given of a case in which the GW ID "GW1" of the GW 200*a* is not stored in the move history DB 131 included in the center 100.

Then, the center 100 sends, to the GW 200*b* specified at Step S2, a data acquisition request including the device ID "A" of the device 500*a* (Step S3: data acquisition request).

When the GW 200*b* receives the data acquisition request from the center 100, the GW 200*b* refers to the device information DB 231 and determines whether the pointer associated with the data acquisition request is registered (see Step S4: device information reference). Furthermore, the pointer is an example of inquiry destination information. In the example illustrated in FIG. 2, a description will be given of a case in which the "GW1" is stored as the pointer in the device information DB 231 included in the GW 200*b*.

If the pointer associated with the data acquisition request is not registered in the device information DB 231, the GW 200*b* reads the device data from the device information DB 231 and sends the read device data to the center 100. In contrast, if the pointer associated with the data acquisition request is registered in the device information DB 231, the GW 200*b* sends, to the GW 200*a* specified by the subject pointer, the data acquisition request including the device ID "A" (Step S5: data acquisition request).

When the GW 200*a* receives the data acquisition request from the GW 200*b*, the GW 200*a* reads the device data from the device information DB 231 stored in the GW 200*a* and sends the read device data to the GW 200*b* (Step S6: data transmission). Furthermore, in the embodiment, a description will be given of the configuration in which the GW 200*a* that has received the data acquisition request transferred from the GW 200*b* sends the device data to the GW 200*b*; however, the embodiment is not limited to this. For example, it may also be configured such that the GW 200*a* that has received the transferred data acquisition request directly sends the device data to the center 100 without passing through the GW 200*b*.

The GW 200*b* that has received the device data from the GW 200*a* sends, to the center 100, the device data acquired from the GW 200*a* (Step S7: data transmission). At this time, it may also be configured such that the GW 200*b* reads, from the device information DB 231, the device data that has been acquired from the device 500*a* by the GW 200*b* by itself and sends the read device data to the center 100 together with the device data acquired from the GW 200*a*.

Then, the center 100 sends the device data acquired from the GW 200*b* to the user terminal 900 (see Step S8: provide the data).

As described above, each of the GWs 200 sends the device data acquired from the devices 500 by the GWs 200 themselves to the center 100 in accordance with the data acquisition request. Furthermore, in the present invention, each of the GWs 200 stores, in the device information DB 231, the pointer that is used to specify the other GW 200 that has acquired the sensor data, whereby each of the GWs 200 can refer to the device data that has acquired by the other GW 200. Consequently, even if some of the GW ID is deleted from the move history DB 131, the center 100 can acquire, by way of the other GW 200, the device data from the GW 200 that is associated with the deleted GW ID.

In this way, when the management device according to the present invention deletes the connection history of the GW to which a moving device has connected, because the management device allows the other GW that is associated with the connection history before and after the subject GW to store the ID of the GW targeted for the deletion, it is possible to trace the connection history of the subject GW even if data with the certain amount has been deleted.

Functional Configuration of the Center

Figure 3:
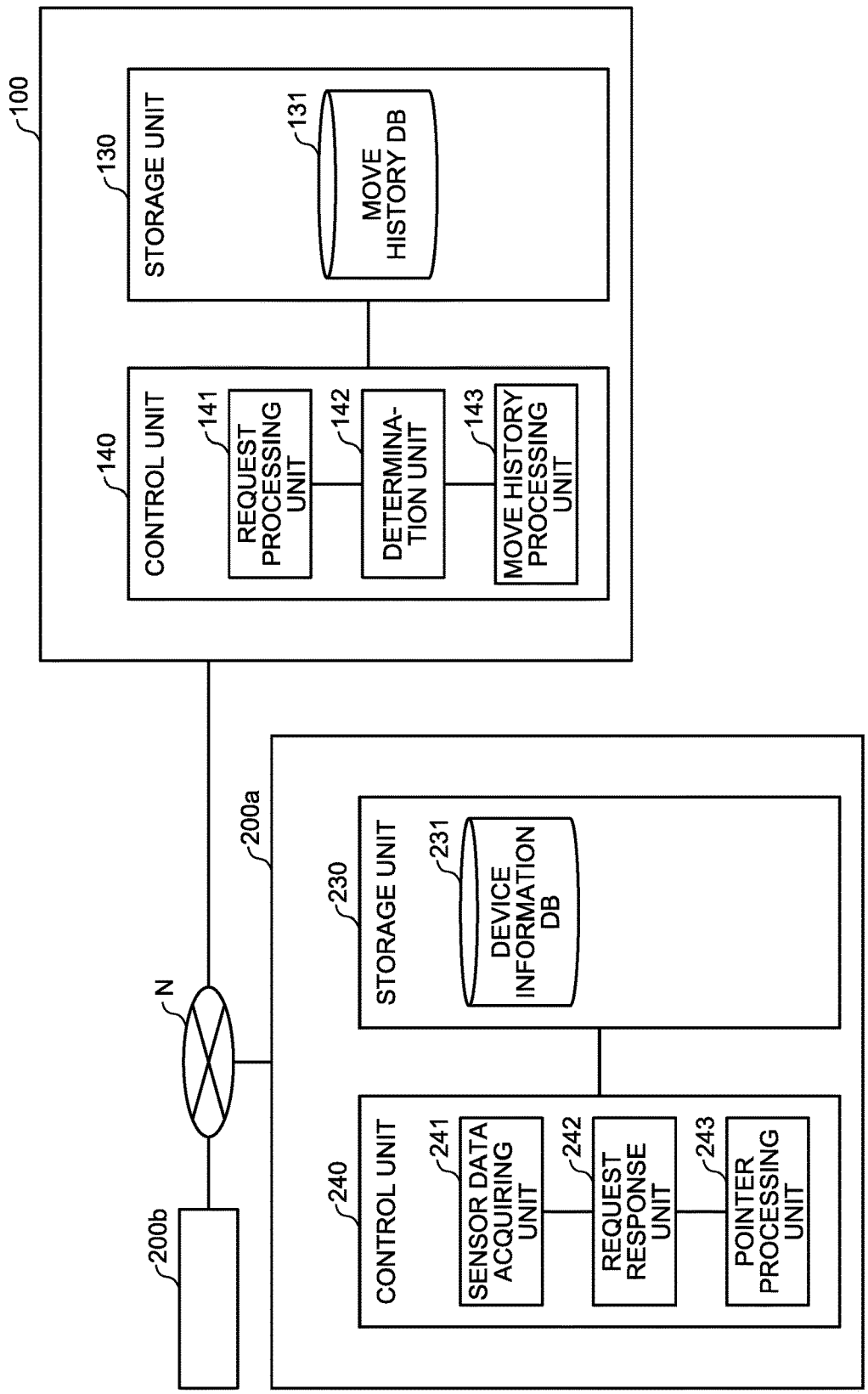
FIG. 3 is a block diagram illustrating an example of the functional configuration.

In the following, the functional configuration of the data management system 10 according to the embodiment will be described with reference to FIG. 3. FIG. 3 is a block diagram illustrating an example of the functional configuration. As illustrated in FIG. 3, the center 100 includes a storage unit 130 and a control unit 140. Furthermore, in addition to the functioning units illustrated in FIG. 3, the center 100 may also include various kinds of functioning units included in a known computer, for example, the functioning units, such as various kinds of input devices, audio output devices, or the like.

The storage unit 130 is implemented by a storage device, such as a semiconductor memory device including, for example, a random access memory (RAM), a flash memory, or the like; a hard disk; an optical disk; or the like. The storage unit 130 includes the move history DB 131. Furthermore, the storage unit 130 stores therein various kinds of information, such as a threshold of, for example, "Nu" or the like, which will be described later, that is used for the process performed by the control unit 140.

The move history DB 131 stores therein the history by associating both the history of the GW 200 that acquires the sensor data from the moving device and the history of the TS at which the sensor data was acquired with each of the devices that moves between the GWs 200 located in the communication available ranges. FIG. 4 is a schematic diagram illustrating an example of the move history DB included in the center. As illustrated in FIG. 4, the move history DB 131 stores therein the "GW ID", the "time stamp", and "Nu" by associating these items with the "device ID". Furthermore, the move history DB 131 is an example of a storage unit in the management device.

The field of the "device ID" indicated by reference numeral 1000 illustrated in FIG. 4 indicates the device ID of the device that has collected the sensor data. In the embodiment, the move history DB 131 has a single table for each, for example, device ID.

In FIG. 4, the field of the "GW ID" and the field of the "time stamp" indicate the GW ID of the GW 200 that has acquired the sensor data from the subject device and the time at which the sensor data is acquired first by the subject GW 200 from the device, respectively. For example, reference numeral 1001 illustrated in FIG. 4 indicates that the GW 200a with the GW ID of "GW1" starts, at "9:31", to acquire the sensor data from the device with the device ID of "A".

Furthermore, reference numeral 1002 illustrated in FIG. 4 indicates that, instead of the GW 200a with the GW ID of "GW1", the GW 200b with the GW ID of "GW2" starts, after "9:43", to acquire the sensor data from the device with the device ID of "A". Furthermore, a combination of the GW ID and the TS that are stored by being associated with the device ID may sometimes be referred to as "GW data".

In FIG. 4, the fields of "Nu" indicates the reference frequency of the GW data indicating the number of times the center 100 has sent the data acquisition request for the sensor data that is specified by the subject GW data. For example, reference numeral 1001 illustrated in FIG. 4 indicates that, by referring to the GW data indicated by reference numeral 1001 illustrated in FIG. 4, the center 100 has sent a data acquisition request for the sensor data that has been acquired by the device with the device ID of "A" to the GW 200a with the GW ID of "GW1" "10" times.

A description will be given here by referring back to FIG. 3. The control unit 140 in the center 100 is implemented by, for example, a central processing unit (CPU), a micro processing unit (MPU), or the like executing, in the RAM as a work area, the program that is stored in an inner storage device. Furthermore, the control unit 140 may also be implemented by an integrated circuit, such as such as an application specific integrated circuit (ASIC), a field programmable gate array (FPGA), or the like.

The control unit 140 includes a request processing unit 141, a determination unit 142, and a move history processing unit 143 and implements or executes the function or the operation of the information processing that will be described below. Furthermore, the internal configuration of the control unit 140 is not limited to the configuration illustrated in FIG. 3 and another configuration may also be used as long as the configuration in which the information processing that will be described later is used. Furthermore, the request processing unit 141, the determination unit 142, and the move history processing unit 143 are an example of an electronic circuit, such as a processor or the like and an example of the process executed by the processor or the like.

The request processing unit 141 is a processing unit that receives the data acquisition request from the user terminal 900, that sends the data acquisition request to the GW 200, and that sends the acquired sensor data to the user terminal 900. Furthermore, the request is an example of the acquisition request for data and the request processing unit 141 is an example of an acquisition request sending unit.

The request processing unit 141 receives, from the user terminal 900, the data acquisition request that specifies, for example, both the device ID of the device that has acquired the sensor data and the target time period in which data acquisition is requested. Then, the request processing unit 141 refers to the move history DB 131 and sends the data acquisition request that specifies the device ID and the target time period to the GW 200 that is specified by the GW data and that is associated with the data acquisition request. Then, when the request processing unit 141 acquires the device data from the GW 200, the request processing unit 141 sends the acquired device data to the user terminal 900. Furthermore, if the request processing unit 141 refers to the move history DB 131 and sends the data acquisition request, the request processing unit 141 increments the "Nu" value associated with the GW data that was specified when the data acquisition request is transmitted by 1.

For example, a description will be given of a process, with reference to FIGS. 4 and 5, that is performed in a case where the request processing unit 141 receives, from the user terminal 900, the device ID "A" and the data acquisition request specifying the target time period after "9:35" and before "10:15". FIG. 5 is a schematic diagram illustrating another example of the move history DB included in the center. Furthermore, in FIG. 5, the two pieces of GW data indicated by reference numerals 1001 and 1003 are deleted from among the pieces of GW data illustrated in FIG. 4. Furthermore, in FIG. 5, the GW data indicated by reference numeral 1002 is the same GW data as that indicated by reference numeral 1002 illustrated in FIG. 4.

If the request processing unit 141 refers to the move history DB 131 such as that illustrated in, for example, FIG. 4, the request processing unit 141 sends, to the GW 200a with the GW ID of "GW1", the data acquisition request for the sensor data that has been acquired in the time period after "9:35" and before "9:43". Similarly, the request processing unit 141 sends, to the GW 200b with the GW ID of "GW2", the data acquisition request of the sensor data acquired in the time period after "9:43" and before "10:02". Furthermore, the request processing unit 141 sends, to the GW 200 with the GW ID of "GW7", the data acquisition request for the sensor data acquired in the time period after "10:02" and before "10:14". Furthermore, the request processing unit 141 sends, to the GW 200 with the GW ID of "GW6", the data acquisition request for the sensor data acquired in the time period after "10:14" and before "10:15".

In contrast, if the request processing unit 141 refers to the move history DB 131 that does not store therein the GW data related to the GW IDs "GW1" and "GW7" such as that illustrated in, for example, FIG. 5, the request processing unit 141 does not send the data acquisition request to the GW 200 with these device IDs. In this case, the request processing unit 141 specifies the GW data including the TS the immediately before or immediately after the subject GW data and sends the data acquisition request to the GW 200 that is specified by the specified GW data.

For example, the request processing unit 141 sends, to the GW 200b with the GW ID of "GW2", the data acquisition request for the sensor data acquired in the time period after "9:35" and before "10:14". Similarly, the request processing unit 141 sends, to the GW with the GW ID of "GW6", the data acquisition request for the sensor data acquired in the time period after "10:14" and before "10:15". In this case, each of the GWs 200 that have received the data acquisition request transfers the data acquisition request to the other GW 200 that is specified by the pointer registered in the device information DB 231. The data acquisition process performed by using the pointers will be described in detail later with reference to FIG. 9.

Thereafter, if the request processing unit 141 receives, from each of the GWs 200, the device data associated with the sent data acquisition request, the request processing unit 141 sends the device data to the user terminal 900. Furthermore, the request processing unit 141 refers to the move history DB 131 and increments the "Nu" value associated with the GW data related to the data acquisition request by 1. For example, in the example of the move history DB 131 illustrated in FIG. 5, the request processing unit 141 increments the "Nu" value associated with the GW data related to "GW2" indicated by reference numeral 1002 by 1 and sets the "Nu" value to "24".

A description will be given here by referring back to FIG. 3. The determination unit 142 is a processing unit that determines whether the condition for deleting the GW data stored in the move history DB 131 is satisfied and that outputs the determination result to the move history processing unit 143.

For example, the determination unit 142 refers to the move history DB 131 and determines whether the "Nu" value that is associated with each of the pieces of the GW data is equal to or greater than a predetermined threshold. Furthermore, as will be described later, it may also be configured such that the determination unit 142 may also determine whether the value other than the "Nu" value is equal to or greater than the predetermined threshold or it may also be configured such that, in addition to the condition related to the "Nu" value, the determination unit 142 also determines whether the condition related to the other value is also satisfied. In this way, by determining the GW data targeted for deletion on the basis of the reference frequency, the determination unit 142 can select the GW data in which a decrease in the response speed is small even if the subject GW data is deleted.

For example, a determination process performed in a case in which the threshold of "Nu" is "11" will be described. From among the pieces of GW data stored in the move history DB 131 illustrated in FIG. 4, for example, the Nu value of the GW data indicated by reference numeral 1001 is "10" and the Nu value of the GW data indicated by reference numeral 1003 is "5". These Nu values are less than the threshold "11" of "Nu". In contrast, all of the Nu values of the other pieces of GW data stored in the move history DB 131 illustrated in FIG. 4 are equal to or greater than the threshold "11" of "Nu". In this case, the determination unit 142 determines, from among the pieces of GW data stored in the move history DB 131 such as that illustrated in FIG. 4, that the pieces of GW data that are indicated by reference numeral 1001 and reference numeral 1003 and that have the Nu value less than the threshold "11" of "Nu" are targeted for the deletion. Then, the determination unit 142 outputs the determination result that specifies the GW data targeted for the deletion to the move history processing unit 143.

Furthermore, the threshold is previously stored in, for example, the storage unit 130; however, the configuration is not limited to this and the determination unit 142 may also decide a threshold every time when the determination unit 142 performs the determination. In the following, a case in which, for example, the determination unit 142 deletes two out of five pieces of GW data stored in the move history DB 131 illustrated in FIG. 4 will be described. In this case, the determination unit 142 determines, as the threshold of "Nu" from among the "Nu" value associated with the GW data stored in the move history DB 131, the value that is greater than "10", which is the second smallest value, and that is equal to or less than "16", which is the third smallest value.

A description will be given here by referring back to FIG. 3. The move history processing unit 143 is a processing unit that updates the move history DB 131 on the basis of the device ID and the TS received from each of the GWs 200. For example, if the move history processing unit 143 receives the device ID "A" and TS "9:43" from the GW 200b, the move history processing unit 143 stores, in the move history DB 131, the GW data such as that indicated by reference numeral 1002 illustrated in FIG. 4. Furthermore, the move history processing unit 143 is an example of a registration unit, an identification information sending unit, and a reregistration unit. The device ID and TS that are sent by each of the GWs 200 are an example of a connection notification.

The move history processing unit 143 according to the embodiment stores the GW data in the move history DB 131 in, for example, chronological order of the TSs, instead of in the order actually the pieces of GW data are received. As in a case of, for example, the reregistration of the GW data, which will be described later, even if the GW data is received later, if the TS included in the GW data indicates the earlier time, the move history processing unit 143 registers the subject GW data before the GW data that has already been registered.

Furthermore, the move history processing unit 143 updates the GW data stored in the move history DB 131 in accordance with the determination result that is output from the determination unit 142. The move history processing unit 143 deletes, in accordance with the determination result, from among the pieces of GW data stored in the move history DB 131 illustrated in, for example, FIG. 4, the GW data indicated by reference numeral 1001 and reference numeral 1003 and then updates the move history DB 131 such as that illustrated in FIG. 5. The move history processing unit 143 updates the GW data when, for example, predetermined time has elapsed; however, the configuration is not limited to this and the GW data may also be updated at the timing in which the determination result is output from the determination unit 142.

Furthermore, when the move history processing unit 143 deletes the GW data stored in the move history DB 131, the move history processing unit 143 registers the pointer that indicates the GW 200 specified by the subject GW data in the other GW 200. For example, the move history processing unit 143 refers to the move history DB 131 and specifies the pieces of GW data that includes therein the TSs that are immediately before and after the TS included in the GW data that is to be deleted. Then, the move history processing unit 143 sends, to the GW 200 that is specified by the specified GW data, the pointer registration request in which the target device ID, the GW ID and the TS that are included in the GW data that is to be deleted, and the type of pointer, which will be described later, are included.

In the following, a description will be given of a case in which, for example, the move history processing unit 143 deletes the GW data indicated by reference numeral 1003 illustrated in FIG. 4. First, the move history processing unit 143 specifies the GW ID "GW2" of the GW data that includes therein the TS "9:43", which is immediately before the TS "10:02" included in the GW data to be deleted, and specifies the GW ID "GW6" of the GW data that includes therein the TS "10:14", which is immediately after the TS "10:02".

Then, the move history processing unit 143 sends, to the GW 200 with the GW ID of "GW2", the pointer registration request that includes therein the device ID "A", the GW ID "GW7" and the TS "10:02" that are included in the GW data that is to be deleted, and an "F pointer" that is the type of pointer. Furthermore, the move history processing unit 143 sends, to the GW 200 with the GW ID of "GW6", the pointer registration request that includes therein the device ID "A", the GW ID "GW7" and the TS "10:02" that are included in the GW data that is to be deleted, and a "B pointer" that is the type of pointer.

Furthermore, it may also be configured such that the move history processing unit 143 also sends the pointer registration request to the GW 200 that is associated with the GW data that is to be deleted. For example, the move history processing unit 143 sends, to the GW 200 that is specified by the GW ID "GW7" included in the GW data that is to be deleted, the pointer registration request that includes therein the device ID "A", the TS "10:02", the B pointer "GW2", and the F pointer "GW6".

Furthermore, the move history processing unit 143 again registers, in the move history DB 131 in accordance with the determination result performed in the GW 200, the GW data that has been deleted from the move history DB 131. In the following, a description will be given of an example in which the move history processing unit 143 acquires the GW data related to "GW1" that is indicated by reference numeral 1001 illustrated in FIG. 4 and that has been deleted in the example illustrated in FIG. 5 and then reregisters the subject GW data in the move history DB 131. For example, when the move history processing unit 143 receives the combination of the device ID "A" and the GW data in which the GW ID of "GW1" and the TS are included from the GW 200b, the move history processing unit 143 registers the received GW data in the move history DB 131 in the order of TSs.

In the embodiment, the move history processing unit 143 can perform the registration by using the same process even in a case of newly registering the GW data in the move history DB 131 or in a case of reregistering the deleted GW data in the move history DB 131. Furthermore, as described above, the move history processing unit 143 according to the embodiment registers the received GW data in the move history DB 131 in the order of TSs that are included in the pieces of GW data. Consequently, it is possible to reregister the deleted GW data in the move history DB 131 without changing the function held by the already existing move history processing unit 143 included in the center 100.

Functional Configuration of the GW

A description will be given here by referring back to FIG. 3. The GW 200 includes a storage unit 230 and a control unit 240. The storage unit 230 is implemented by a semiconductor memory device, such as a RAM, a flash memory, or the like, and a storage device, such as a hard disk, an optical disk, or the like. The storage unit 230 includes the device information DB 231. Furthermore, the storage unit 230 stores therein various kinds of information, such as a threshold of "Np", which will be described later, that is used in the process performed in the control unit 240.

The device information DB 231 stores therein the device data that includes the sensor data and that is acquired by the GW 200 from each of the devices by associating the device data with the pointer that indicates the other GW 200 that is the acquisition destination of the sensor data. Furthermore, the device information DB 231 is an example of a storage unit in the relay device.

The data stored in the device information DB 231 will be described with reference to FIG. 6. FIG. 6 is a schematic diagram illustrating an example of the device information DB related to GW2. As illustrated in FIG. 6, the device information DB 231 stores therein, in an associated manner, the "device ID", the "time stamp", the "sensor data", the "B pointer", the "F pointer", and the "Np".

In FIG. 6, the field of the "device ID" and the field of the "time stamp" store therein information indicating that the sensor data has been acquired from which device at what time. The field of the "sensor data" stores therein the acquired sensor data. For example, reference numeral 2001 illustrated in FIG. 6 indicates that the GW 200b has acquired, from the device 500 with the device ID of "A", the sensor data of "24.1° C." at "9:43".

The field of the "B pointer" stores therein the pointer that specifies the GW 200 that has acquired, from the device 500 specified by the associated device data, the sensor data immediately before the time indicated by the associated TS. The field of the "F pointer" stores therein the pointer that specifies the GW 200 that has acquired, from the device 500 specified by the associated device data, the sensor data immediately after the time indicated by the associated TS. For example, reference numeral 2003 illustrated in FIG. 6 indicates that the GW ID of the GW 200 that has acquired the sensor data from the device 500 with the device ID of "A" immediately before "9:43" is "GW1". Furthermore, if the pointer is not registered, "–" is stored in the fields of the "B pointer" and the "F pointer".

The field of "Np" indicates the reference frequency of the pointer indicating the number of transmission of the data acquisition request that specifies the subject B pointer or the F pointer. For example, reference numeral 2005 illustrated in FIG. 6 indicates that the data acquisition request that specifies the B pointer indicated by reference numeral 2003 is sent "5" times. Similarly, reference numeral 2013 illustrated in FIG. 6 indicates that the data acquisition request that specifies "GW7" in the F pointer has not yet been sent. In the embodiment, as illustrated in FIG. 6, if none of the associated B pointer and the F pointer is stored, "–" is stored in the field of "Np". Furthermore, regarding each of the "B pointer" and the "F pointer", it may also be configured such that the number of transmission of the data acquisition request is sent is separately stored.

A description will be given here by referring back to FIG. 3. The control unit 240 in the GW 200 is implemented by, for example, a CPU, an MPU, or the like, executing, in the RAM as a work area, the program that is stored in an inner storage device. Furthermore, the control unit 240 may also be implemented by an integrated circuit, such as an ASIC, an FPGA, or the like.

The control unit 240 includes a sensor data acquiring unit 241, a request response unit 242, and a pointer processing unit 243 and implements or executes the function or the operation of the information processing that will be described below. Furthermore, the internal configuration of the control unit 240 is not limited to the configuration illustrated in FIG. 3 and another configuration may also be used as long as the configuration in which the information processing that will be described later is used. Furthermore, the sensor data acquiring unit 241, the request response unit 242, and the pointer processing unit 243 are an example of an electronic circuit, such as a processor or the like and an example of the process executed by the processor or the like.

The sensor data acquiring unit 241 is a processing unit that acquires the sensor data from the device 500. The sensor data acquiring unit 241 stores the sensor data acquired from the device 500 in the device information DB 231 by associating the sensor data with the device ID of the subject device 500 and the TS that indicates the time at which the sensor data has been acquired. For example, if the sensor data acquiring unit 241 in the GW 200b acquires the sensor data of "24.1° C." from the device with the device ID of "A" at "9:43", the sensor data acquiring unit 241 stores, in the device information DB 231, the record such as that indicated by reference numeral 2001 illustrated in FIG. 6. Furthermore, the sensor data acquiring unit 241 is an example of an acquiring unit.

Furthermore, when the sensor data acquiring unit 241 acquires the sensor data from each of the devices 500 first time, the sensor data acquiring unit 241 sends, to the center 100, the combination of the device ID of the subject device 500 and the TS stored in the device information DB 231. For example, when the sensor data acquiring unit 241 in the GW 200b acquires the sensor data such as that indicated by reference numeral 2001 illustrated in FIG. 6, the sensor data acquiring unit 241 sends, to the center 100, the device ID "A" and the TS "9:43". In contrast, when the sensor data acquiring unit 241 acquires the sensor data such as that indicated by reference numeral 2011 illustrated in FIG. 6, because the sensor data acquiring unit 241 has already sent the device ID and the TS to the center 100, the sensor data acquiring unit 241 does not send the device ID and the TS to the center 100. Furthermore, the timing in which the sensor data acquiring unit 241 sends the device ID and the TS to the center 100 is not limited to this and the configuration described in the subsequent embodiment may also be used.

The request response unit 242 is a processing unit that acquires the sensor data and responds when the request response unit 242 receives a data acquisition request from the center 100 or the other GWs 200. Furthermore, the request response unit 242 is an example of a response control unit, an instruction sending unit, and a deletion unit.

When the request response unit 242 receives the data acquisition request including the device ID and the target time period from, for example, the center 100, the request response unit 242 refers to the device information DB 231.

Then, the request response unit 242 sends to the center 100 as a response, the device data specified by the subject device ID and the TS included in the subject target time period.

Furthermore, if the pointer that indicates the inquiry destination of the other GW 200 is stored in the device information DB 231 by being associated with the subject device data, the request response unit 242 transfers the data acquisition request received from the center 100 to the GW 200 that is specified by the pointer. Then, if the request response unit 242 acquires the device data from, for example, the other GW 200, the request response unit 242 collectively sends the device data that has been read from the device information DB 231 and the acquired device data to the center 100. Furthermore, the request response unit 242 increments, by 1, the "Np" that is stored in the device information DB 231 and that is associated with the pointer that was referred to when the data acquisition request was transferred.

Furthermore, in a case in which the request response unit 242 receives the data acquisition request from the other GW 200 instead of receiving the center 100, the request response unit 242 also performs the same process as that performed when the request response unit 242 receives the data acquisition request from the center 100.

In the following, a case in which, for example, the GW 200b receives the data acquisition request for the sensor data from the center 100 will be described with reference to FIGS. 6 to 8. First, if the request response unit 242 receives the data acquisition request for the sensor data that is received from the device with the device ID of "A" in the time period after "9:35" and before "10:14", the request response unit 242 refers to the device information DB 231. Then, the request response unit 242 sequentially reads the pieces of sensor data associated with the TS of "9:43" and the device ID of "A".

Then, because the F pointer of "GW7" indicated by reference numeral 2013 is associated with the sensor data that includes therein the TS of "9:59" indicated by reference numeral 2011 illustrated in FIG. 6, the request response unit 242 transfers the data acquisition request to the GW 200 with the GW ID of "GW7". In this case, the request response unit 242 ends the reading of the device data from the device information DB 231. Furthermore, because the B pointer of "GW1" indicated by reference numeral 2003 is associated with the sensor data that includes therein the TS of "9:43" indicated by reference numeral 2001 illustrated in FIG. 6, the request response unit 242 transfers the data acquisition request to the GW 200a with the GW ID of "GW1".

Then, the request response unit 242 sends, to the center 100, the device data that is read from the device information DB 231 and the device data that is received from the GW 200 with the GW ID of "GW7" and the GW 200a. Furthermore, the request response unit 242 increments the "Np" indicated by, for example, reference numerals 2005 and 2013 illustrated in FIG. 6 by 1 and sets each of the "Nps" to "6" and "1".

A description will be given here by referring back to FIG. 3. The pointer processing unit 243 is a processing unit that performs a process of registering or deleting the pointer in the device information DB 231. Furthermore, the pointer processing unit 243 is an example of a registration unit.

First, if the pointer processing unit 243 receives the pointer registration request from the center 100, the pointer processing unit 243 refers to the device ID, the TS, and the pointer type included in the received pointer registration request and then specifies the device data stored in the device information DB 231. For example, a description will be given of a case in which the pointer processing unit 243 in the GW 200b receives the pointer registration request that includes therein the device ID of "A", the TS of "10:02", and the pointer type of "F pointer". First, the pointer processing unit 243 refers to the device information DB 231 and specifies the device data that includes therein the TS that is immediately before "10:02". For example, if the pointer processing unit 243 refers to the device information DB 231 such as that illustrated in FIG. 6, the pointer processing unit 243 specifies the device data that includes therein the device ID of "A" and the TS of "9:59" such as that indicated by reference numeral 2011.

Then, the pointer processing unit 243 associates the GW ID included in the received pointer registration request with the specified device data together with the pointer type and resister the associated data. For example, the pointer processing unit 243 related to the GW2 registers, as indicated by reference numeral 2013 illustrated in FIG. 6, the GW ID of "GW7" included in the received pointer registration request in the device information DB 231 as the "F pointer".

In the following, a description will be given of a process performed by the pointer processing unit 243 when the GW 200b receives the pointer registration request that includes therein the device ID of "A", the TS of "9:31", and the pointer type of "B pointer" from the center 100. First, the pointer processing unit 243 refers to the device information DB 231 and specifies, from among the TSs associated with the device ID of "A", the TS of "9:43" that is immediately after the TS of "9:31" included in the received pointer registration request. Then, the pointer processing unit 243 related to GW2 registers, as the B pointer as indicated by reference numeral 2003, the GW ID of "GW1" included in the pointer registration request in the device information DB 231 by associating the GW ID of "GW1" with the TS of "9:43" and the device ID of "A" indicated by reference numeral 2001 illustrated in FIG. 6.

Furthermore, in the following, a process performed by the pointer processing unit 243 in the GW 200 when the GW 200 specified by the GW ID of "GW7" that is to be deleted in the center 100 receives the pointer registration request from the center 100 will be described with reference to FIG. 7. FIG. 7 is a schematic diagram illustrating an example of the device information DB related to GW7. For example, as indicated by reference numerals 2101 and 2103 illustrated in FIG. 7, the pointer processing unit 243 registers the both B pointer of "GW2" and the F pointer of "GW6" by associating the both pointers with the device ID of "A" and the TS of "10:02" that are included in the received pointer registration request.

Furthermore, the pointer processing unit 243 determines, on the basis of the "Np", whether the GW data specified by the pointer and the TS that are associated with the "Np" is again registered in the center 100. The pointer processing unit 243 determines, at, for example, the predetermined timing, whether the "Np" stored in the device information DB 231 is equal to or greater than the predetermined threshold. If the pointer processing unit 243 determines that the "Np" is equal to or greater than the predetermined threshold, the pointer processing unit 243 acquires the TS from the GW 200 that is specified by the associated pointer and then sends the GW ID of the subject GW 200 and the received TS to the center 100.

For example, a description will be given of a case in which the "Np" of the B pointer of "GW1" is "5" stored in the device information DB 231 in the GW 200b and the threshold of the "Np" stored in the storage unit 230 is "3". In this case, because the "Np" is equal to or greater than the threshold, the pointer processing unit 243 determines that the GW data related to the "GW1" is reregistered. In this case, the pointer processing unit 243 sends, to the GW 200a with the GW ID of "GW1" associated with the B pointer, a TS acquisition request that includes therein the pointer type of "B pointer", the device ID of "A", and the TS of "9:43".

Then, when the pointer processing unit 243 receives the TS from the GW 200a, the pointer processing unit 243 sends, to the center 100, the received TS, the GW ID of the GW 200 that has sent the TS, and the device ID. For example, if the pointer processing unit 243 receives the TS of "9:31" from the GW 200a as the response to the TS acquisition request described above, the pointer processing unit 243 sends the GW ID of "GW1", the TS of "9:31", and the device ID of "A" to the center 100.

Furthermore, if the pointer processing unit 243 receives the TS acquisition request from the other GW 200, the pointer processing unit 243 refers to the device information DB 231, specifies the TS, and sends a response to the subject GW 200. In the following, a case in which, for example, the pointer processing unit 243 in the GW 200a with the GW ID of "GW1" receives, from the GW 200b, the TS acquisition request that includes therein the device ID "A", the TS of "9:43", the GW ID of "GW2", and the pointer type of "B pointer" will be described with reference to FIG. 8. FIG. 8 is a schematic diagram illustrating an example of the device information DB related to GW1. First, the pointer processing unit 243 refers to the device information DB 231 illustrated in FIG. 8 and specifies the GW ID of "GW2" that corresponds to the "F pointer", that is associated with the TS of "9:41" that is immediately before the received TS, and that is indicated by reference numeral 2201. Then, the pointer processing unit 243 refers to the device information DB 231; specifies the earliest TS of "9:31" from among the TSs associated with the device ID "A" such as that indicated by reference numeral 2211 illustrated in FIG. 8; and sends the specified TS to the GW 200b. Furthermore, if the other F pointer or the B pointer has already been registered by being associated with the received device ID before the time indicated by the received TS, it may also be configured such that the pointer processing unit 243 specifies, instead of specifying the earliest TS, the TS that is immediately after the subject pointer.

Furthermore, after sending the TS to the center 100, the pointer processing unit 243 deletes the pointer stored in the device information DB 231 and updates the "Np". For example, if the pointer processing unit 243 related to GW2 sends the device ID of "A", the TS of "9:43", and the GW ID of "GW1" to the center 100, the pointer processing unit 243 deletes the B pointer of "GW1" indicated by reference numeral 2003 illustrated in FIG. 6. Furthermore, the pointer processing unit 243 updates the Np indicated by reference numeral 2005 illustrated in FIG. 6 to "−". Furthermore, it may also be configured such that the pointer processing unit 243 deletes the pointer after the pointer processing unit 243 receives a pointer deletion instruction from the center 100.

Comparison of Request Processes

Figure 9:
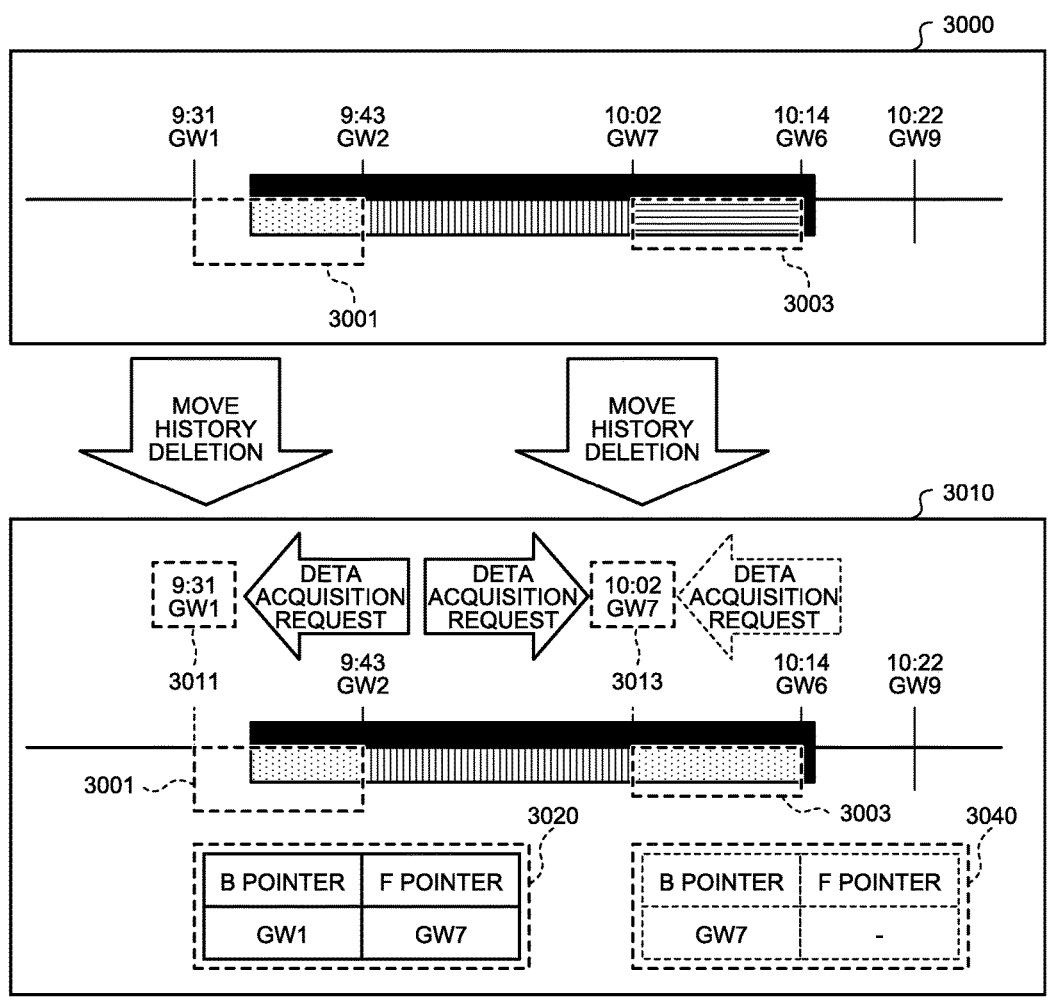
FIG. 9 is a schematic diagram illustrating an example of a data acquisition process performed by using a pointer.

A difference between the request processes performed before and after the update of the move history DB 131 will be described with reference to FIG. 9. FIG. 9 is a schematic diagram illustrating an example of a data acquisition process performed by using a pointer. In the following, as described above, a description will be given of an example of a case in which the request processing unit 141 acquires, from the user terminal 900, an acquisition request for the data that has been acquired from the device with the device ID of "A" after "9:35" and before "10:15".

For example, if the request processing unit 141 refers to the move history DB 131 such as that illustrated in FIG. 4, as described above, the request processing unit 141 sends the data acquisition request to each of the GWs 200 with the GW IDs of "GW1", "GW2", "GW7" and "GW6". As indicated by reference numeral 3000 illustrated in FIG. 9, the request processing unit 141 requests the sensor data indicated by, for example, reference numeral 3001 illustrated in FIG. 9 from the GW 200*a* and requests the sensor data indicated by reference numeral 3003 illustrated in FIG. 9 from the GW with the GW ID of "GW7".

In contrast, if the request processing unit 141 refers to the move history DB 131 such as that illustrated in FIG. 5, the pieces of GW data indicated by reference numerals 3011 and 3013 are deleted from the move history DB 131. Thus, as indicated by reference numeral 3010 illustrated in FIG. 9, the request processing unit 141 does not send the data acquisition request to both the GW 200 with the GW ID of "GW7" and the GW 200*a* with the GW ID of "GW1". As indicated by reference numeral 3010 illustrated in FIG. 9, the request processing unit 141 sends the data acquisition request to only the GW 200 with the GW ID of "GW6" and the GW 200*b* with the GW ID of "GW2".

In this case, the request response unit 242 in the GW 200*b* that has received the data acquisition request refers to the pointer that is stored in the device information DB 231 such as that indicated by reference numeral 3020 illustrated in FIG. 9 and transfers the data acquisition request to the GW 200*a* and the GW 200 with the GW ID of "GW7". Similarly, the request response unit 242 in the GW 200 with the GW ID of "GW6" refers to the pointer stored in the device information DB 231 such as that indicated by reference numeral 3040 illustrated in FIG. 9, whereby the request response unit 242 can transfer the data acquisition request to the GW 200 with the GW ID of "GW7".

In this way, the request response unit 242 in the GW 200 that has received the data acquisition request can request the other GW 200 to acquire data by referring to the pointer stored in the device information DB 231. Consequently, the request processing unit 141 in the center 100 can also acquire, by way of the other GW 200, the sensor data that is acquired by the GW 200 whose GW data is not stored in the move history DB 131.

Flow of Each of the Processes

Figure 10:
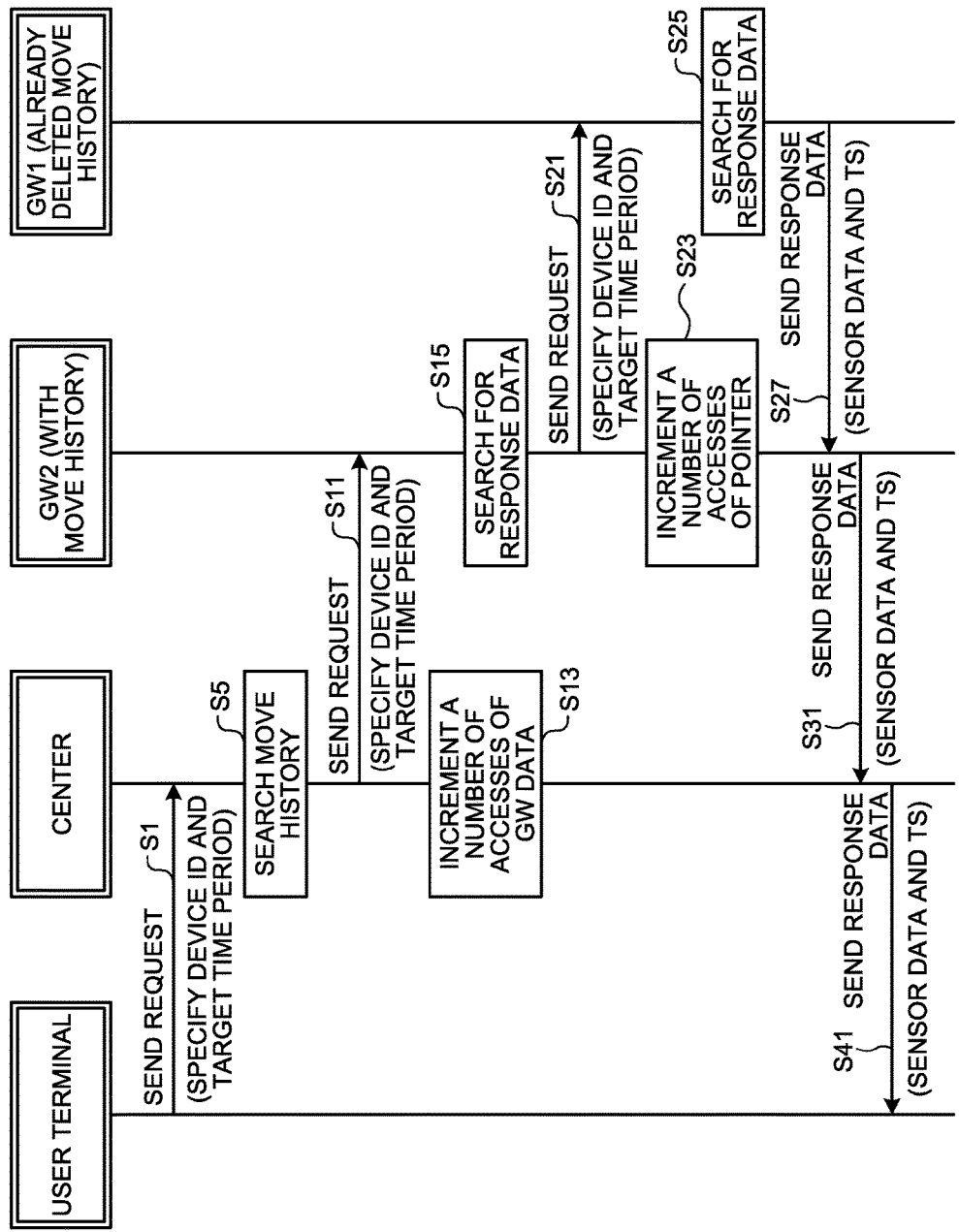
FIG. 10 is a sequence diagram illustrating an example of a request process.
Figure 11:
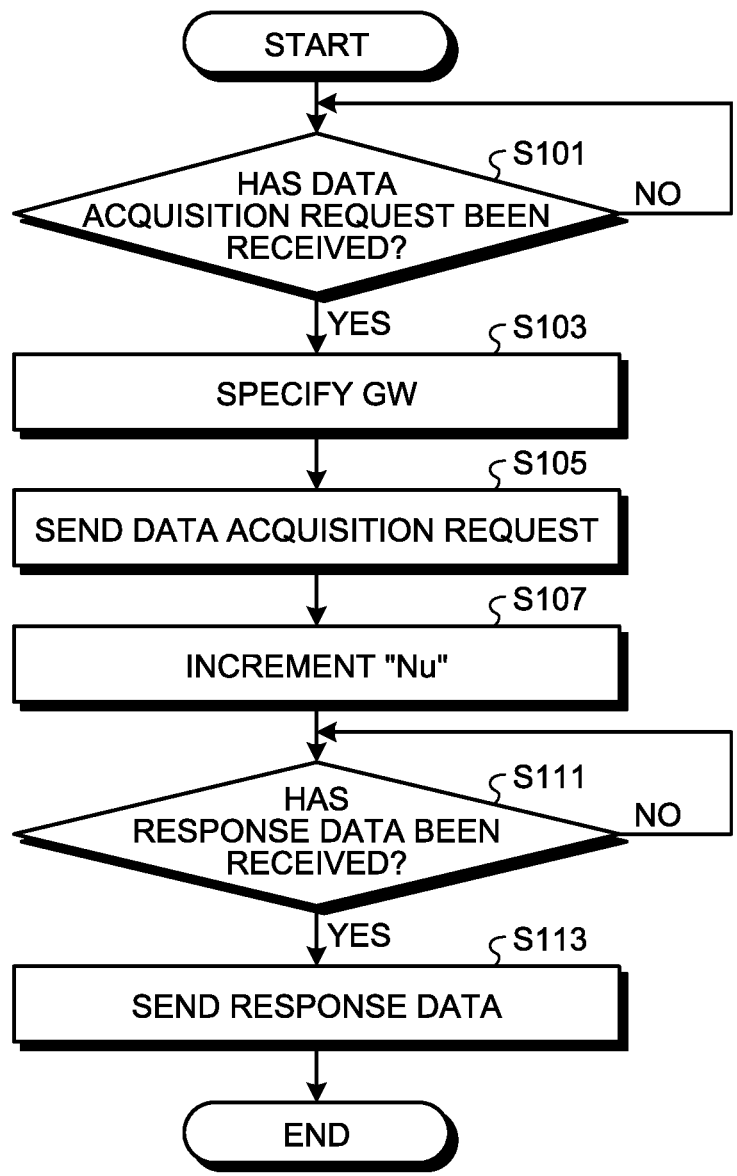
FIG. 11 is a flowchart illustrating an example of the request process performed in the center.
Figure 12:
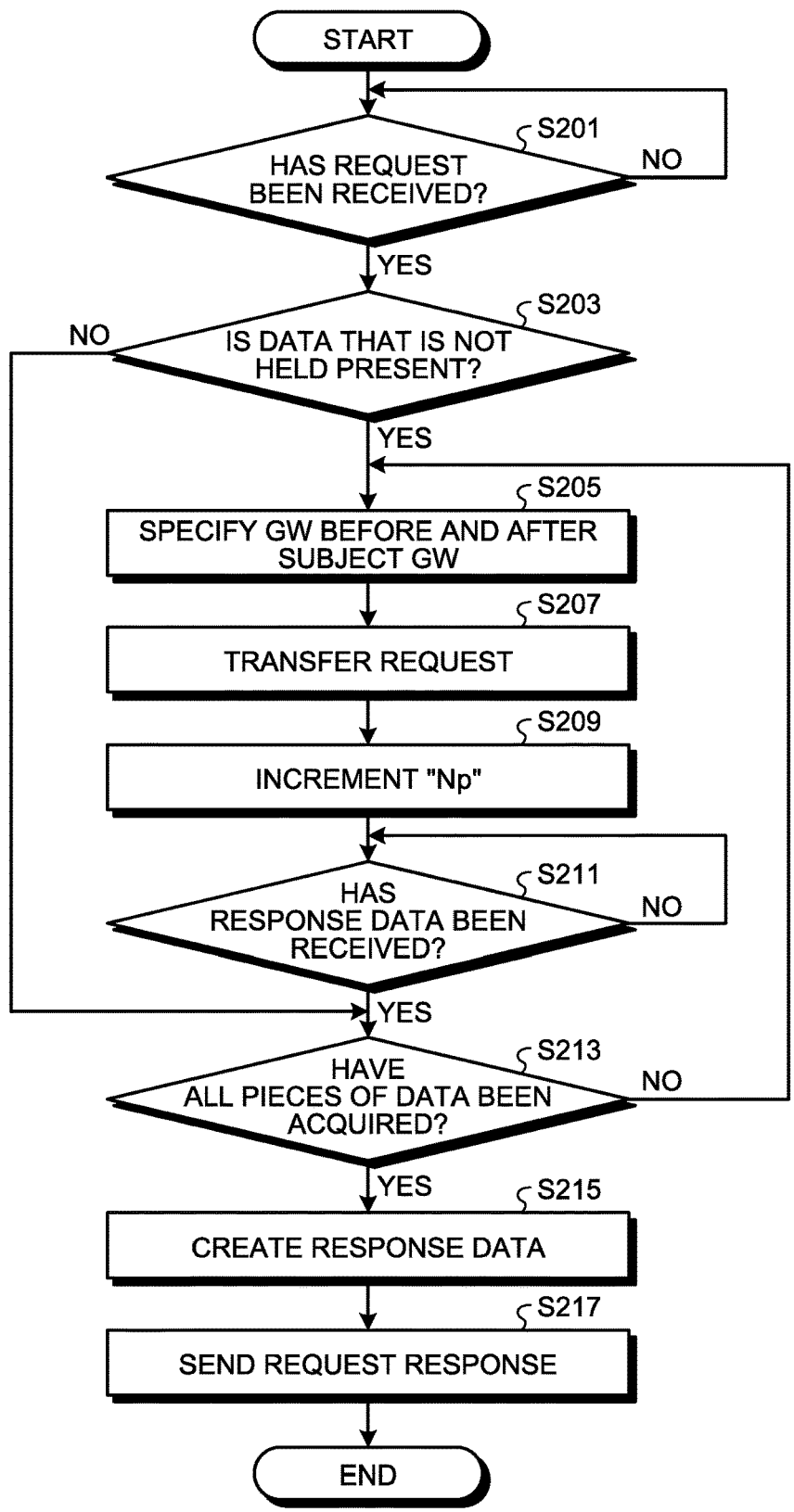
FIG. 12 is a flowchart illustrating an example of a request response process in the GW.

In the following, the flow of the request processes performed in the data management system 10 according to the embodiment will be described with reference to FIGS. 10 to 12. FIG. 10 is a sequence diagram illustrating an example of a request process. In FIG. 10, a description will be given of the configuration in which the GW 200*b* that has the GW ID of "GW2" and that receives a request from the center 100 acquires data from the GW 200*a* that has the GW ID of "GW1". Furthermore, in the example described below, the GW data related to the GW ID of "GW2" is stored in the move history DB 131 in the center 100; however, the GW data related to the GW ID of "GW1" has already been deleted.

First, the user terminal 900 sends a request to the center 100 for specifying the device ID and the target time period (Step S1). The request processing unit 141 in the center 100 that has received the request refers to the move history DB 131 and specifies the GW data that is associated with the received device ID and the target time period (Step S5). Then, the request processing unit 141 sends, to the specified GW 200, a request that includes therein the device ID and the target time period (Step S11). Furthermore, the request processing unit 141 increments the "Nu" value of the specified GW data registered in the move history DB 131 by 1 (Step S13).

The request response unit 242 in the GW 200*b* that has received the request from the center 100 refers to the device information DB 231 and reads the device data that includes therein the received device ID and the target time period (Step S15). Furthermore, if a pointer is associated with the read device data, the request response unit 242 transfers the request that includes therein the device ID and target time period to the GW 200*a* that is specified by the pointer (Step S21). Furthermore, the request response unit 242 increments the "Np" value of the specified GW data registered in the device information DB 231 by 1 (Step S23).

The request response unit 242 in the GW 200*a* that has received the request transferred from the GW 200*b* refers to the device information DB 231 and reads the sensor data, which is included in the received device ID and the target time period, and the TS (Step S25). Then, the request response unit 242 in the GW 200*a* sends the read sensor data and the TS to the GW 200*b* (Step S27).

The request response unit 242 in the GW 200*b* that has received the sensor data and the TS from the GW 200*a* sends the received sensor data and the TS and sends the sensor data and the TS read from the device information DB 231 to the center 100 (Step S31). The request processing unit 141 in the center 100 sends the sensor data and the TS received from the GW 200*b* to the user terminal 900 (Step S41). In this way, by holding a pointer in each of the GWs 200, even if a part of the move history is deleted in the center 100, it is possible to implement both the maintenance of a response speed of data acquisition and a reduction in storage capacity.

In the following, a request process performed in the center 100 will be described with reference to FIG. 11. FIG. 11 is a flowchart illustrating an example of the request process performed in the center. First, the request processing unit 141 in the center 100 determines whether the data acquisition request from the user terminal 900 has been received (Step S101). If the request processing unit 141 does not receive the data acquisition request from the user terminal 900 (No at Step S101), the request processing unit 141 waits until the request processing unit 141 receives the data acquisition request.

If the request processing unit 141 receives the data acquisition request from the user terminal 900 (Yes at Step S101), the request processing unit 141 refers to the move history DB 131 and specifies the GW 200 on the basis of the device ID and the target time period that are specified by the data acquisition request (Step S103). Then, the request processing unit 141 sends the data acquisition request that includes therein the device ID and the target time period to the specified GW 200 (Step S105). Furthermore, the request processing unit 141 increments the reference frequency indicated by "Nu" of the GW data that is associated with the specified GW 200 by 1 (Step S107). Then, the request processing unit 141 determines whether the response data has been received from the GW 200 (Step S111). If the request processing unit 141 has not received the response data (No at Step S111), the request processing unit 141 waits until the request processing unit 141 receives the response data.

If the request processing unit 141 receives the response data from the GW 200 (Yes at Step S111), the request processing unit 141 sends the received response data to the user terminal 900 (Step S113).

In the following, the request response process performed in each of the GWs 200 will be described with reference to FIG. 12. FIG. 12 is a flowchart illustrating an example of the request response process in the GW. First, the request response unit 242 in the GW 200 determines whether the data acquisition request is received from the center 100 or the other GW 200 (Step S201). If the request response unit 242 in the GW 200 does not receive the data acquisition request (No at Step S201), the request response unit 242 waits until the request response unit 242 receives the data acquisition request.

If the request response unit 242 receives the data acquisition request from the center 100 or the other GW 200 (Yes at Step S201), the request response unit 242 refers to the device information DB 231. Then, the request response unit 242 determines whether the device information DB 231 holds all of the pieces of the device data associated with the received data acquisition request (Step S203). If the device information DB 231 holds all of the pieces of the device data (No at Step S203), the request response unit 242 proceeds to Step S213.

If device data that is not held by the device information DB 231 is present (Yes at Step S203), the request response unit 242 refers to the pointer stored in the device information DB 231 and specifies the GWs 200 before and after the subject GW 200 (Step S205). Then, the request response unit 242 transfers the received data acquisition request to the specified GWs 200 before and after the subject GW 200 (Step S207). Furthermore, the request response unit 242 increments the reference frequency "Np" of the pointer associated with the specified GW 200 by 1 (Step S209). Then, the request response unit 242 determines whether the response data has been received from the GWs 200 before and after the subject GW 200 (Step S211). If the request response unit 242 does not receive the response data (No at Step S211), the request response unit 242 waits until the request response unit 242 receives the response data.

If the request response unit 242 receives the response data from the GWs 200 before and after the subject GW 200 (Yes at Step S211), the request response unit 242 determines whether all of the pieces of the device data have been received (Step S213). If the request response unit 242 has not received all of the pieces of the device data from the user terminal 900 (No at Step S213), the request response unit 242 waits until the request response unit 242 acquires all of the pieces of the device data. If the request response unit 242 acquires all of the pieces of the device data (Yes at Step S213), the request response unit 242 creates the response data by using the received device data and the device data that is read from the device information DB 231 (Step S215). Then, the request response unit 242 sends the created response data to the center 100 (Step S217).

Figure 13:
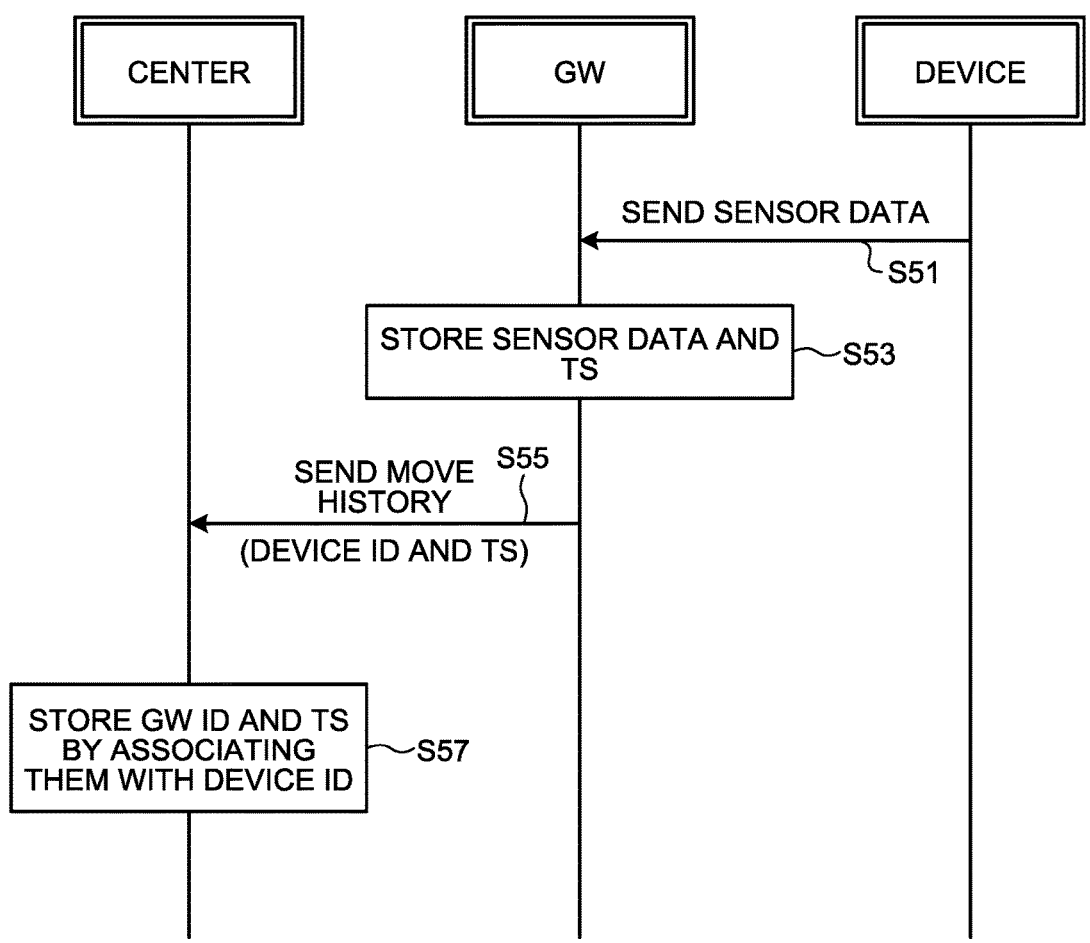
FIG. 13 is a sequence diagram illustrating an example of a move history update process.

In the following, a move history update process that stores the device data in the GW 200 and that stores the GW data in the center 100 will be described with reference to FIGS. 13 to 17. FIG. 13 is a sequence diagram illustrating an example of the move history update process. First, if the sensor data acquiring unit 241 in the GW 200 receives the sensor data from the device 500 (Step S51), the sensor data acquiring unit 241 associates the received sensor data and the TS with the device ID and stores the associated data in the device information DB 231 (Step S53).

Furthermore, if the sensor data acquiring unit 241 does not receive the sensor data from the subject device 500 in the past, the sensor data acquiring unit 241 sends the device ID and the TS to the center 100 (Step S55). The move history processing unit 143 in the center 100 that has received the device data associates the GW data that includes therein the GW ID of the GW 200 and the TS with the received device ID and stores the associated data in the move history DB 131 (Step S57).

Figure 14:
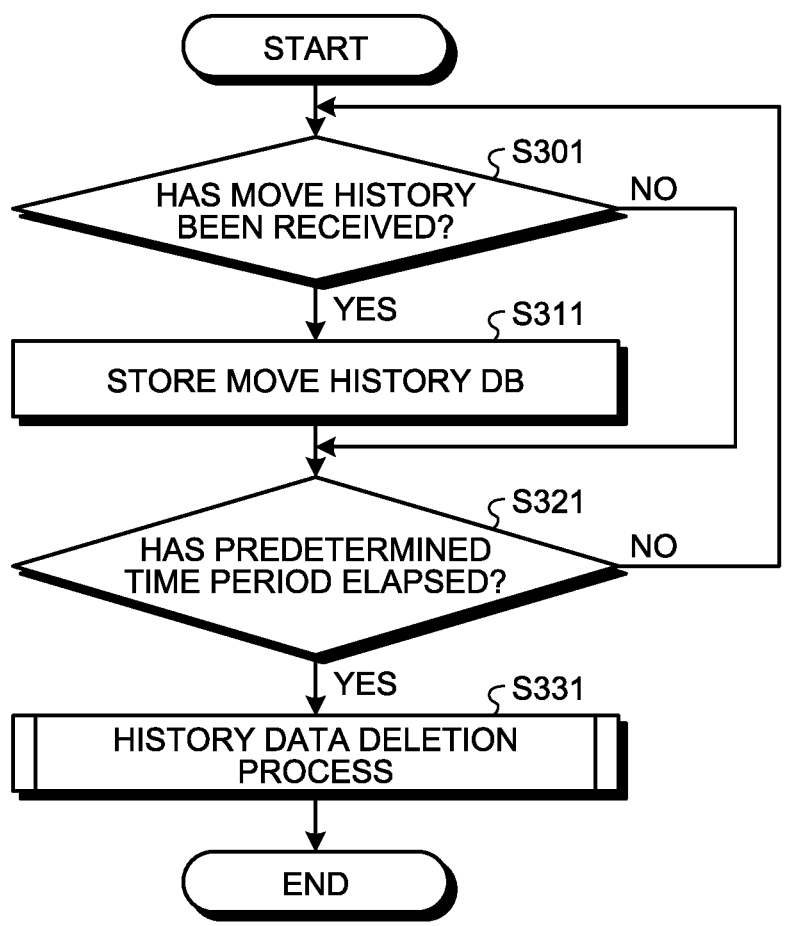
FIG. 14 is a flowchart illustrating an example of the move history update process performed in the center.

In the following, a move history update process performed in the center 100 will be described with reference to FIG. 14. FIG. 14 is a flowchart illustrating an example of the move history update process performed in the center. First, the request processing unit 141 in the center 100 determines whether the move history that includes therein the GW ID and the TS has been received from the GW 200 (Step S301). If the request processing unit 141 has received the move history (Yes at Step S301), the request processing unit 141 associates both the received TS and the GW ID of the GW 200 with the device ID and stores the associated data in the move history DB 131 (Step S311). Then, the request processing unit 141 proceeds to Step S321.

If the request processing unit 141 has not received the move history from the GW 200 (No at Step S301), the request processing unit 141 determines whether a predetermined time period has elapsed (Step S321). If the predetermined time period has not elapsed (No at Step S321), the request processing unit 141 waits until the predetermined time period has elapsed. If the predetermined time period has elapsed (Yes at Step S321), the request processing unit 141 outputs an instruction to perform the history data deletion process to the determination unit 142 (Step S331).

Figure 15:
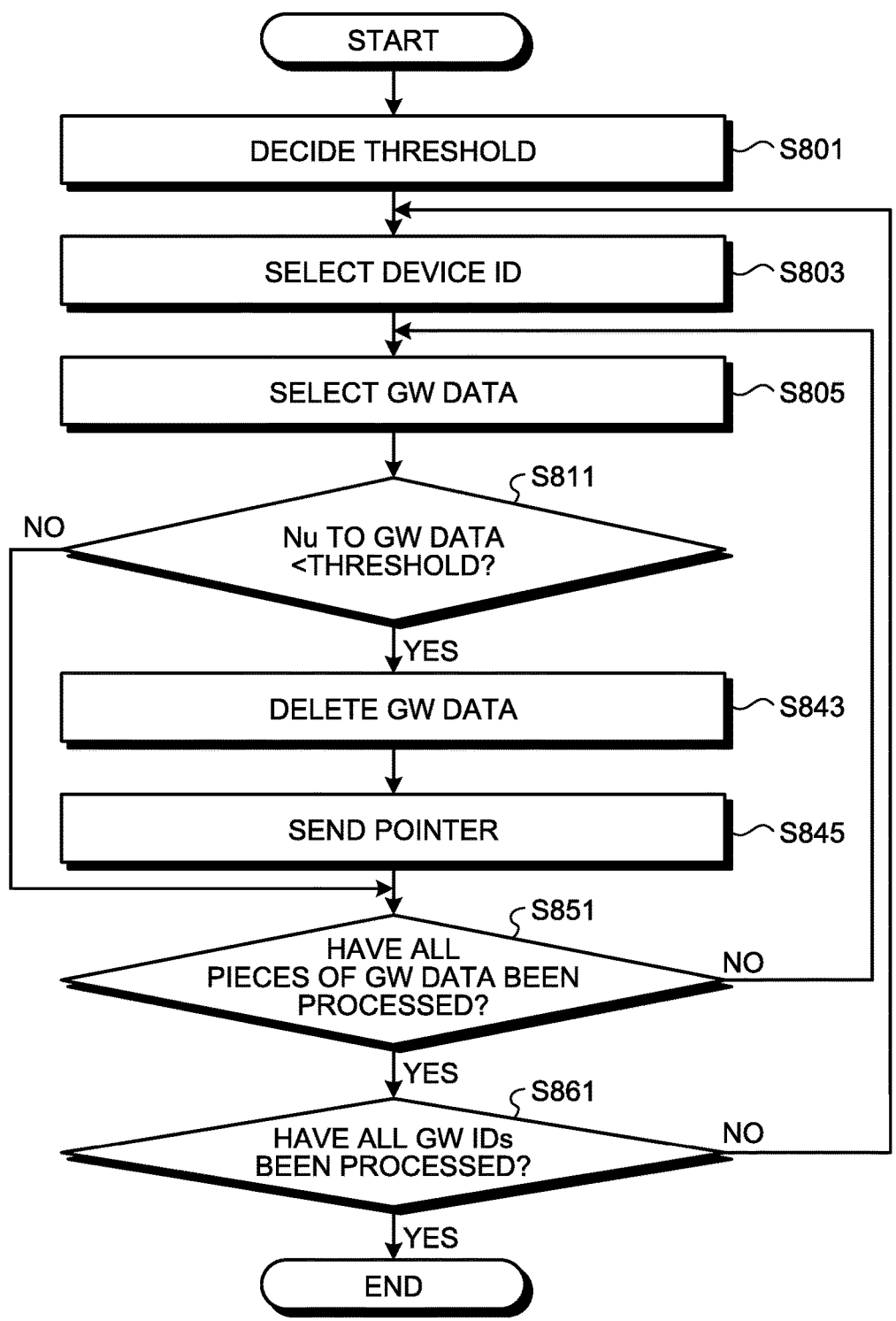
FIG. 15 is a flowchart illustrating an example of a history data deletion process performed in the center.

FIG. 15 is a flowchart illustrating an example of a history data deletion process performed in the center. First, the determination unit 142 in the center 100 decides the threshold of "Nu" (Step S801). Then, the determination unit 142 refers to the move history DB 131, selects the device ID (Step S803), and selects the stored GW data (Step S805).

Then, the determination unit 142 determines whether the value of "Nu" associated with the selected GW data is equal to or greater than the decided threshold (Step S811). If the value of "Nu" is equal to or greater than the threshold (No at Step S811), the determination unit 142 proceeds to Step S851. In contrast, if the value of "Nu" is less than the threshold (Yes at Step S811), the determination unit 142 outputs, to the move history processing unit 143, the determination result indicating that the subject GW data it targeted for the deletion. The move history processing unit 143 that receives the input of the determination result deletes the subject GW data from the move history DB 131 (Step S843). Then, the move history processing unit 143 sends the pointer to the GW 200 that is specified by the GW data to be deleted and the GWs 200 that is before and after the subject GW 200 (Step S845).

Then, the determination unit 142 determines whether the process has been performed on all of the pieces of the GW data associated with the device ID (Step S851). If the process has not been performed on all of the pieces of the GW data (No at Step S851), the determination unit 142 repeats the process until the process is performed on all of the pieces of the GW data. If the process has been performed on all of the pieces of the GW data associated with the device ID (Yes at Step S851), the determination unit 142 determines whether the process has been performed related to all of the device IDs stored in the move history DB 131 (Step S861). If the process has not been performed related to all of the device IDs (No at Step S861), the determination unit 142 repeats the process until the process is performed related to all of the device IDs. If the process has been performed related to all of the device IDs (Yes at Step S861), the determination unit 142 ends the process.

Figure 16:
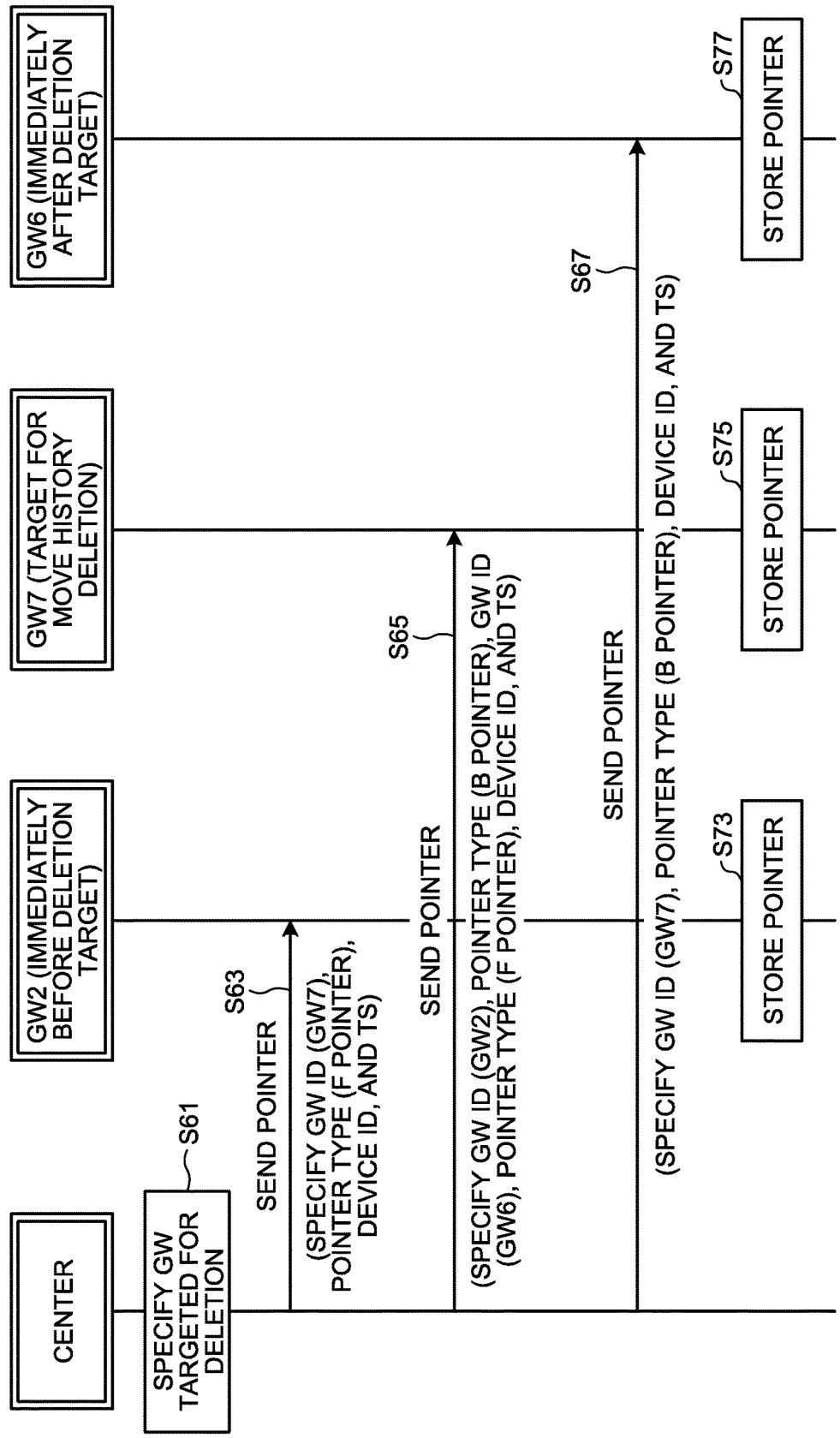
FIG. 16 is a sequence diagram illustrating an example of a move history deletion process.

In the following, the flow of the process, in accordance with a move history deletion process, performed by the center 100 and the GWs 200 will be described with reference to FIG. 16. FIG. 16 is a sequence diagram illustrating an example of the move history deletion process. First, the move history processing unit 143 in the center 100 specifies the GW 200 targeted for the deletion (Step S61). Then, the move history processing unit 143 refers to the move history DB 131 and sends, to the specified GW 200, the GW ID that corresponds to the pointer, the pointer type, the device ID, and the TS (Steps S63, 65, and 67).

Specifically, the move history processing unit 143 sends the GW ID of "GW7", the pointer type of "F pointer", the device ID of "A", and the TS to the GW 200b that has the GW ID of "GW2" and that is stored immediately before the GW ID of "GW7" that is targeted for the deletion (Step S63).

Furthermore, the move history processing unit 143 sends the GW ID of "GW6", the pointer type of "F pointer", the device ID "A", and the TS to the GW 200 that has the GW ID of "GW7" and that is targeted for the deletion. At this time, the move history processing unit 143 also sends the GW ID of "GW2" and the pointer type of "B pointer" to the GW 200 that has the GW ID of "GW7" and that is targeted for the deletion (Step S65).

Furthermore, the move history processing unit 143 sends the GW ID of "GW7", the pointer type of "B pointer", the device ID of "A", and the TS to the GW 200 that has the GW ID of "GW6" and that is stored immediately after the GW ID "GW7" that is targeted for the deletion (Step S67).

The pointer processing unit 243 in each of the GWs 200 associates the received GW ID with the device ID, the pointer type, and the TS and stores the associated data as the F pointer or the B pointer in the device information DB 231 (Steps S73, S75, and S77).

Figure 17:
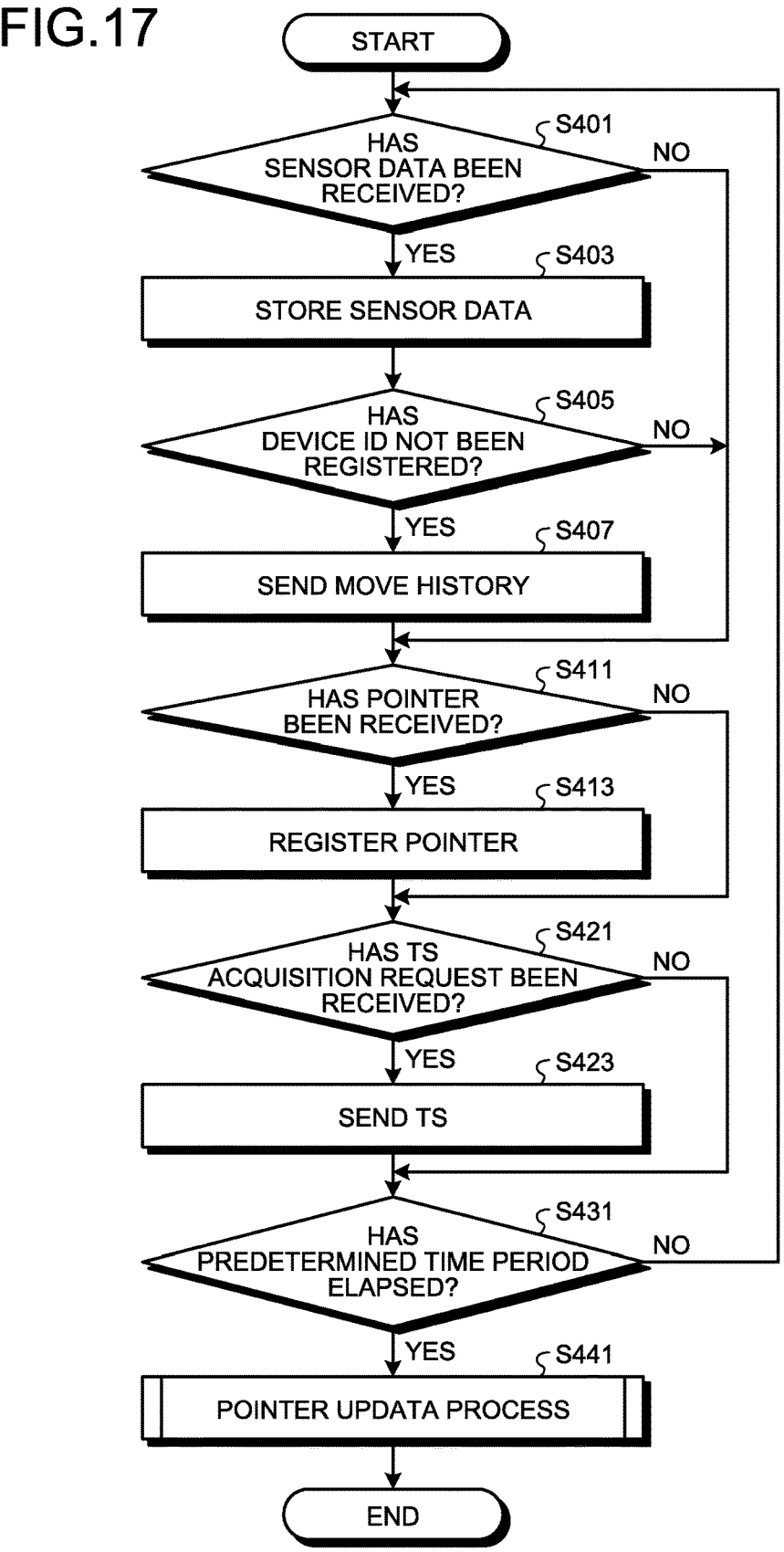
FIG. 17 is a flowchart illustrating an example of a device data update process performed in the GW.

In the following, a device data update process performed in the GW 200 will be described with reference to FIG. 17. FIG. 17 is a flowchart illustrating an example of the device data update process performed in the GW. First, the sensor data acquiring unit 241 in the GW 200 determines whether the sensor data has been received from the device 500 (Step S401). If the sensor data acquiring unit 241 has received the sensor data (Yes at Step S401), the sensor data acquiring unit 241 stores the sensor data, the device ID, and the TS in the device information DB 231 (Step S403). In contrast, if the sensor data acquiring unit 241 has not received the sensor data (No at Step S401), the sensor data acquiring unit 241 moves to Step S411.

The sensor data acquiring unit 241 that has received the sensor data determines whether the received device ID has been registered in the device information DB 231 (Step S405). If the device ID has not been registered (Yes at Step S405), the request processing unit 141 sends the move history including the device ID and the TS to the center 100 (Step S407). In contrast, if the device ID has been registered (No at Step S405), the process proceeds to Step S411.

Then, the sensor data acquiring unit 241 determines whether the pointer has been received from the center 100 (Step S411). If the sensor data acquiring unit 241 has received the pointer (Yes at Step S411), the sensor data acquiring unit 241 registers the received pointer in the device information DB 231 (Step S413). In contrast, if the pointer has not been received (No at Step S411), the sensor data acquiring unit 241 proceeds to Step S421.

Then, the sensor data acquiring unit 241 determines whether the TS acquisition request has been received from the other GW 200 (Step S421). If the sensor data acquiring unit 241 has received the TS acquisition request (Yes at Step S421), the sensor data acquiring unit 241 refers to the device information DB 231 and sends, as a response, the TS associated with the TS acquisition request to the other GW 200 (Step S423). In contrast, if the TS acquisition request has not been received (No at Step S421), the sensor data acquiring unit 241 proceeds to Step S431.

Then, the sensor data acquiring unit 241 determines whether the predetermined time period has elapsed (Step S431). If the predetermined time period has not elapsed (No at Step S431), the sensor data acquiring unit 241 waits until the predetermined time period has elapsed. If the predetermined time period has elapsed (Yes at Step S431), the sensor data acquiring unit 241 performs the pointer update process (Step S441).

Figure 18:
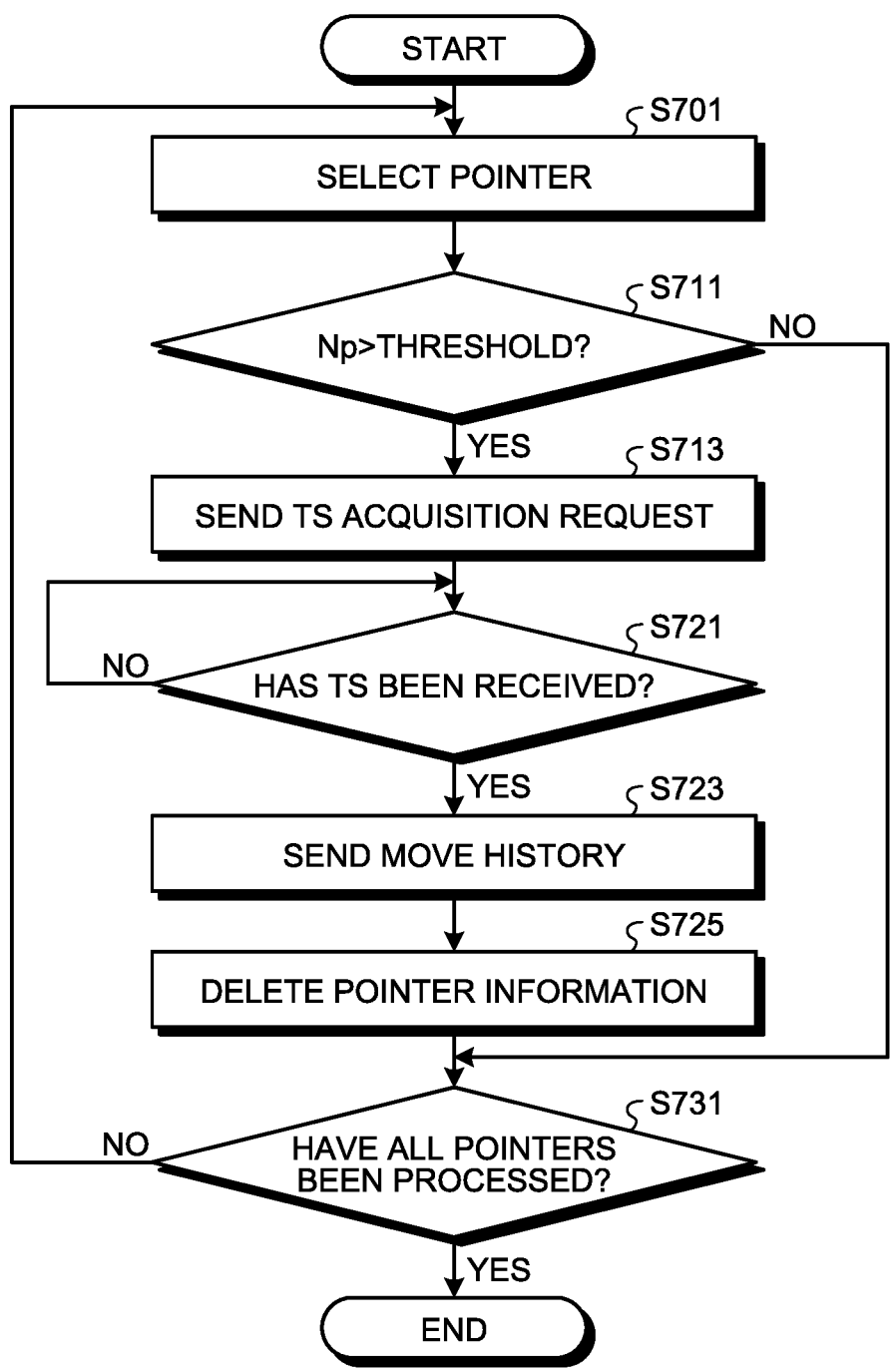
FIG. 18 is a flowchart illustrating an example of a pointer update process performed in the GW.

In the following, a pointer update process performed in the GW 200 will be described. FIG. 18 is a flowchart illustrating an example of a pointer update process performed in the GW. First, the pointer processing unit 243 in the GW 200 refers to the device information DB 231 and selects the pointer (Step S701). Then, the pointer processing unit 243 determines whether the value of "Np" of the selected pointer is equal to or greater than the predetermined threshold (Step S711). If the value of the "Np" is less than the predetermined threshold (No at Step S711), the pointer processing unit 243 proceeds to Step S731.

If the value of "Np" is equal to or greater than the predetermined threshold (Yes at Step S711), the pointer processing unit 243 sends the TS acquisition request to the other GW 200 that is specified by the pointer (Step S713). Then, the pointer processing unit 243 determines whether the TS has been received from the subject GW 200 (Step S721). If the pointer processing unit 243 determines that the TS has not been received (No at Step S721), the pointer processing unit 243 waits until the pointer processing unit 243 receives the TS.

If the pointer processing unit 243 has received the TS from the other GW 200 (Yes at Step S721), the pointer processing unit 243 sends the received TS to the center 100 by associating the received TS with the GW ID of the subject GW 200 and the device ID (Step S723). Then, the pointer processing unit 243 deletes the subject pointer from the device information DB 231 (Step S725). Then, the pointer processing unit 243 determines whether the process has been performed on all of the pointers stored in the device information DB 231 (Step S731). If the process has not been performed on all of the pointers (No at Step S731), the pointer processing unit 243 repeats the process until the process is performed on all of the pointers. If the process has been performed on all of the pointers (Yes at Step S731), the pointer processing unit 243 ends the process.

Figure 19:
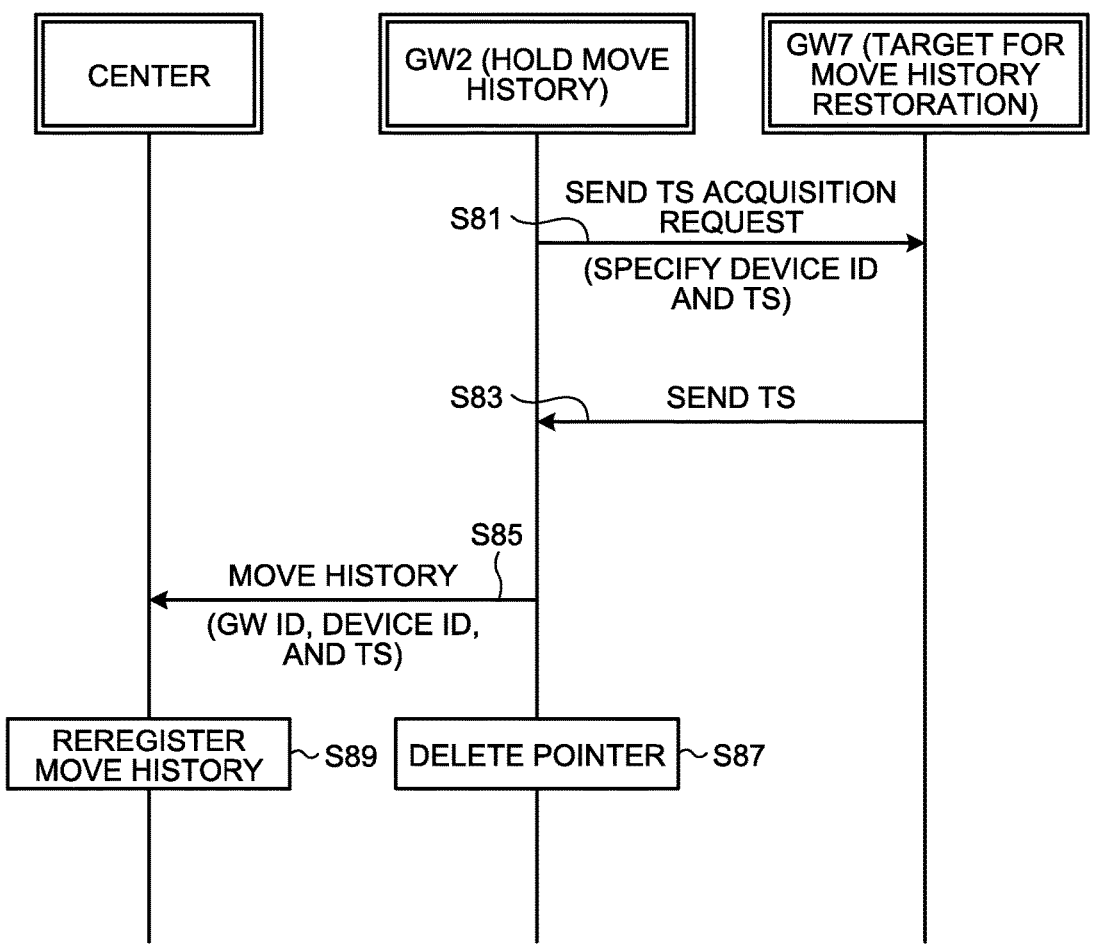
FIG. 19 is a sequence diagram illustrating an example of a move history reregistration process.

In response to the result of the pointer update process such as that illustrated in FIG. 18, the GW data indicating the move history between the GWs 200 related to the devices 500 is reregistered in the move history DB 131 in the center 100. FIG. 19 is a sequence diagram illustrating an example of a move history reregistration process. In FIG. 19, the GW data on the GW2 has been registered in the move history DB 131 in the center 100; however, a description will be given of an example in which the GW data on the GW7 has been deleted.

First, the pointer processing unit 243 related to the GW 2 sends the TS acquisition request that specifies both the device ID and the TS associated with the pointer (Step S81). The pointer processing unit 243 in the GW7 that has received the TS acquisition request sends the TS that is associated to the received device ID and the TS to the GW 2 (Step S83).

The pointer processing unit 243 related to the GW 2 that has received the TS from the GW7 sends the move history that includes therein the GW ID of the GW7, the device ID, and the received TS to the center 100 (Step S85). Furthermore, the pointer processing unit 243 related to the GW 2 deletes the pointer associated with the TS acquisition request from the device information DB 231 (Step S87).

When the move history processing unit 143 in the center 100 receives the move history from the GW 2, the move history processing unit 143 associates the received GW ID and the TS with the received device ID and reregisters the associated data in the move history DB 131 (Step S89).

In the move history reregistration process described above, the move history processing unit 143 in the center 100 can receive the same move history data as that used in the normal move history update process and register the move history data that is received by using the same process in the move history DB 131.

By performing the processes described above, the center 100 can acquire, on the basis of the pointers stored in the other GWs 200, the device data from the GW 200 that holds the device data even in also a case in which the move history data between the GWs associated with the devices 500. Furthermore, according to the embodiment, even in a case in which the move history data has been deleted, because the move history data can be reregistered in accordance with the reference frequency of the subsequent device data, it is possible to suppress a decrease in the response speed needed to acquire data.

[b] Second Embodiment

In the first embodiment, a description has been given of the configuration in which, when the determination unit 142 in the center 100 determines whether GW data is deleted, the threshold of the reference frequency of the subject GW data is used; however, the threshold used by the determination unit 142 is not limited to this. For example, in a case in which the determination unit 142 determines whether the subject GW data is deleted from the move history DB 131, the determination process can be performed by using the threshold related to the hop count of the passed GWs 200 when the sensor data specified by the subject GW data is acquired. Furthermore, because the embodiment can be implemented by the same functional configuration as that used in the first embodiment illustrated in FIG. 3, a description of the functional configuration in detail will be omitted.

Determination Process by Using the Hop Count

For example, if the threshold of the hop count "n" is "2", the determination unit 142 determines whether, in a case in which the GW data is deleted, when the sensor data is acquired, two or more GWs need to be hopped. If two or more GWs need to be hopped when the sensor data is acquired, the determination unit 142 determines that the subject GW data is not to be targeted for the deletion and then outputs an instruction to the move history processing unit 143.

For example, in the move history DB 131 illustrated in FIG. 4, the hop count "n" to each of the adjacent GWs 200 is "1". Namely, as illustrated in FIG. 4, the hop count "n" to the GW 200 that has the GW ID of "GW7" is "1" from the GW 200b with the GW ID of "GW2" and from also the GW 200 with the GW ID of "GW6". In this case, because "n" is less than the threshold of "2", the determination unit 142 determines, as illustrated in FIG. 5, that the GW data associated with the GW ID of "GW7" is deleted from the move history DB 131.

In contrast, in the move history DB 131 such as that illustrated in FIG. 4, the hop count "n" from the GW 200b with the GW ID of "GW2" to the GW ID of "GW9" is "3". In this case, because "n" is equal to or greater than the threshold of "2", the determination unit 142 determines, in the move history DB 131 such as that illustrated in FIG. 5, that the GW data associated with the GW ID of "GW6" is not deleted.

Figure 20:
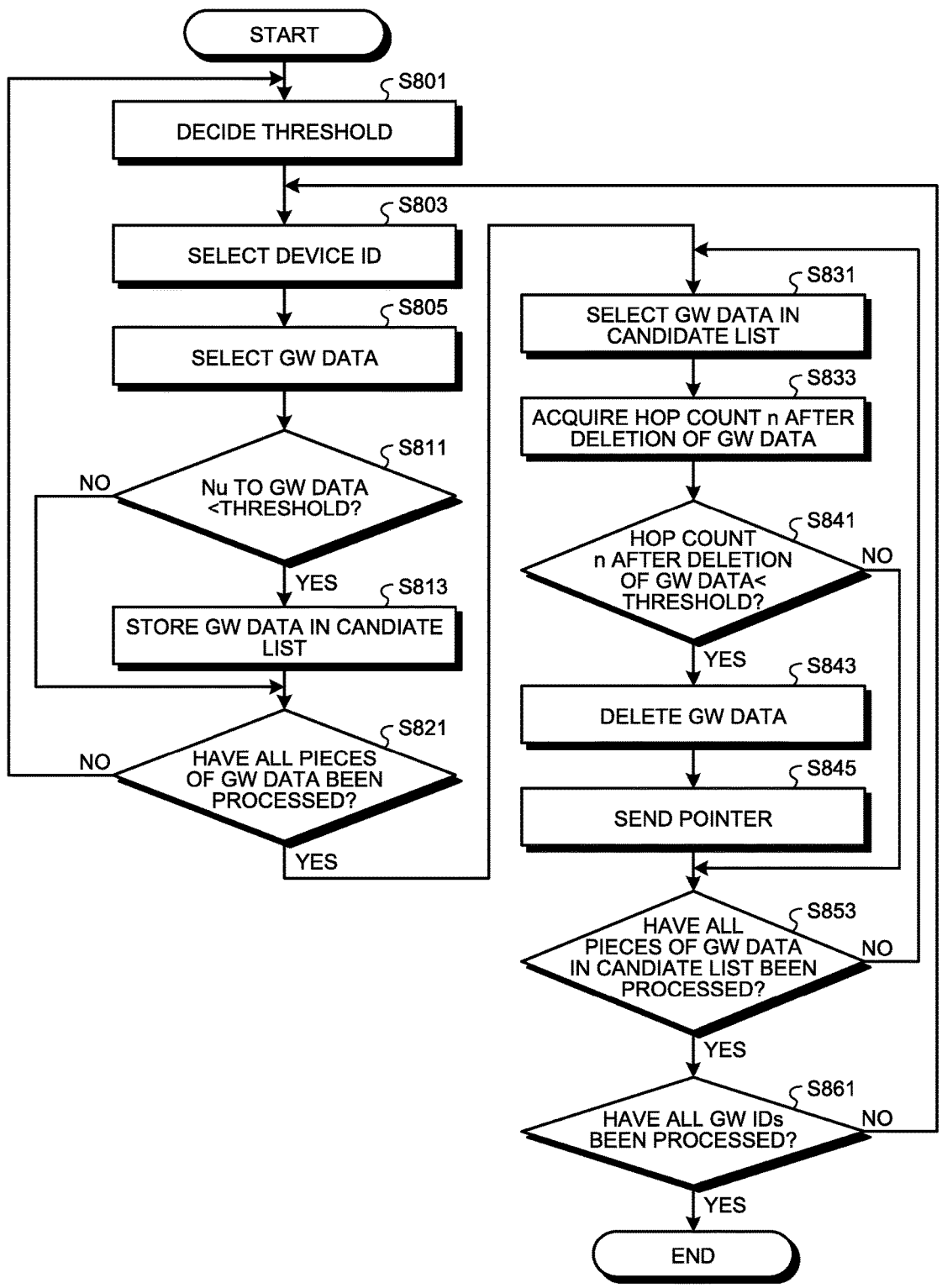
FIG. 20 is a flowchart illustrating an example of a history data deletion process performed in a center according to a second embodiment.

In the following, the configuration in which the determination unit 142 determines whether the history data is deleted by using the hop count will be described with reference to FIG. 20. FIG. 20 is a flowchart illustrating an example of a history data deletion process performed in a center according to a second embodiment. Furthermore, in FIG. 20, because the processes indicated by the same step numbers as those used in FIG. 15 are the same processes illustrated in FIG. 15, the descriptions thereof will be omitted.

At Step S811, if the determination unit 142 determines that the value of the "Nu" is less than the threshold (Yes at Step S811), the determination unit 142 stores the selected GW data in the candidate list (Step S813). In contrast, if the value of the "Nu" is equal to or greater than the threshold (No at Step S811), the determination unit 142 proceeds to Step S821.

Then, regarding all of the pieces of GW data, the determination unit 142 determines whether the process of determining whether the value of the "Nu" is equal to or greater than the threshold has been completed (Step S821). If the process has not been completed on all of the pieces of GW data (No at Step S821), the determination unit 142 repeats the process of performing determination about the unprocessed GW data. If the determination unit 142 has completed the process of performing determination on all of the pieces of the GW data (Yes at Step S821), the determination unit 142 selects the GW data stored in the candidate list (Step S831).

Then, the determination unit 142 acquires the hop count "n", in a case where the selected GW data is deleted, from the GW 200 that is specified by the other GW data stored in the move history DB 131 to the GW 200 that is specified by the selected GW data (Step S833). Furthermore, the hop count between the GWs 200 can be acquired by executing a command called, for example, the known "traceroute"; however, the method is not limited to this and it is also possible to use the configuration in which, for example, each of the GWs 200 refers to the table that stores therein the hop count to the other GWs 200.

Then, the determination unit 142 determines whether the hop count "n" is less than the threshold of "n" (Step S841). If the hop count "n" is less than the threshold (Yes at Step S841), the determination unit 142 deletes the selected GW data from the move history DB 131 (Step S843).

In contrast, if the hop count "n" is equal to or greater than the threshold (No at Step S841), the determination unit 142 proceeds to Step S851 without deleting the GW data. Namely, even if the GW data in which the number of accesses of "Nu" is less than the threshold, the GW data having the value of "n" equal to or greater than the threshold is excluded from the target for the deletion of the history data.

Thereafter, the determination unit 142 determines whether the process has been performed on all of the pieces of GW data in a candidate list (Step S851). If the process has not been performed on all of the pieces of GW data (No at Step S851), the determination unit 142 repeats the process on the unprocessed GW data. If the determination unit 142 has completed the process on all of the pieces of GW data in the candidate list (Yes at Step S853), the determination unit 142 proceeds to Step S861.

By performing the process described above, the center 100 can prevent an increase in the response time needed when the sensor data is acquired from the GW 200 due to an increase in the hop count "n" in a case in which the GW data stored in the move history DB 131 is deleted.

Furthermore, it may also be configured such that, instead of using the threshold of the hop count "n", the determination unit 142 performs the determination process by using the response time needed when each of the GWs 200 acquires the sensor data from the other GWs 200. Furthermore, it may also be configured such that both the hop count "n" using the F pointer and the hop count "n" using the B pointer are acquired and, only if both the hop counts "n" are less than the threshold, the GW data is targeted for the deletion.

[c] Third Embodiment

Configuration in Which the "Np" Value is Stored on the Center Side

In the first embodiment, the configuration in which the GW 200 stores, in the device information DB 231, the number of transfers "Np" of the data acquisition request performed by using the pointer that is stored in the device information DB 231 in each of the GWs 200; however, the configuration is not limited to this. For example, it may also be possible to use the configuration in which, instead of the GW 200, the center 100 stores therein the "Np". In the following, in the embodiment, the configuration in which the center 100 stores therein the "Np" will be described. Furthermore, in addition to the functional configuration described in the first embodiment illustrated in FIG. 3, the functional configuration in the embodiment further includes, by the storage unit 130 in the center 100, a pointer use frequency DB 132.

An example of each of the DBs in the embodiment will be described with reference to FIGS. 21 to 23. FIG. 21 is a schematic diagram illustrating an example of a move history DB included in a center according to a third embodiment. The move history DB 131 according to the embodiment differs from the move history DB 131 according to the first embodiment illustrated in FIG. 4 in that the "GW ID", the "time stamp", and the "Nu" are associated with the "device data ID" indicated by reference numeral 4000.

The device data ID is the information for identifying a combination of the device ID and the TS that are associated with the sensor data. For example, as indicated by reference numeral 4001, the device data ID of "6" is attached to the sensor data acquired by the GW 200b with the GW ID "GW2" from the "device A" at "9:43".

In the following, an example of the pointer use frequency DB 132 will be described. FIG. 22 is a schematic diagram illustrating an example of a pointer use frequency DB included in the center according to the third embodiment. As illustrated in FIG. 22, the pointer use frequency DB 132 associates the "GW ID", the "pointer type", and the "Np" with the device data ID and stores therein the data. In FIG. 22, the record indicated by reference numeral 4101 stores therein the number of accesses "Np" to the pointer that is associated with the device data indicated by reference numeral 4001 illustrated in FIG. 21. Reference numeral 4103 illustrated in FIG. 22 indicates that the data acquisition request was transferred "5" times by using the "B pointer" stored in the GW 200b that has the GW ID of "GW2" and that is associated with the device data ID.

In the following, an example of the device information DB 231 in the GW 200 according to the embodiment will be described. FIG. 23 is a schematic diagram illustrating an example of a device information DB related to GW2 according to the third embodiment. As illustrated in FIG. 23, the device information DB 231 according to the embodiment associates the "device ID", the "time stamp", the "sensor data", the "B pointer", and the "F pointer" with the "device data ID" and stores the associated data. In contrast, the device information DB 231 according to the embodiment differs from the device information DB 231 according to the first embodiment in that the device information DB 231 does not store the number of accesses "Np" to the pointer.

As indicated by reference numeral 4201 illustrated in FIG. 23, the B pointer of "GW1" is associated with the device data ID "6". Namely, the Np of "5" indicated by reference numeral 4103 illustrated in FIG. 22 indicates the number of transfers of the data acquisition request performed by using the B pointer of "GW1" stored in the GW 200b with the GW ID of "GW2".

In the following, a description will be given of a process that is different from the processes performed in the first embodiment from among the processes performed by each of the processing units according to the third embodiment. First, in addition to each of the processes described in the first embodiment, the move history processing unit 143 in the center 100 receives, from each of the GWs 200, a notification that the data acquisition request has been transferred by using the pointer and then increments the "Np" stored in the pointer use frequency DB 132 by 1.

Furthermore, the move history processing unit 143 determines whether the Np stored in the pointer use frequency DB 132 is equal to or greater than the threshold and sends the TS acquisition request to the GW 200 specified by the device data ID associated with the Np that is equal to or greater than the threshold. Then, if the move history processing unit 143 receives the move history that includes therein the TS, the GW ID, and the device ID from the GW 200, the move history processing unit 143 reregisters the received TS and the GW ID in the move history DB 131 and deletes the record that is associated with the device data ID stored in the pointer use frequency DB 132. Furthermore, the move history processing unit 143 sends the pointer deletion instruction to the GW 200.

In the embodiment, instead of the process of incrementing the "Np" by 1, the request response unit 242 in each of the GWs 200 sends, to the center 100, a notification that the data acquisition request has been transferred by using the pointer. Furthermore, when the pointer processing unit 243 in each of the GWs 200 receives the TS acquisition request from the center 100, the pointer processing unit 243 specifies the pointer on the basis of the device data ID and the pointer type and then sends the TS acquisition request to the other GW 200 that is associated with the pointer. Furthermore, after having received the pointer deletion instruction from the center 100, the pointer processing unit 243 deletes the pointer registered in the device information DB 231. For example, if the pointer processing unit 243 related to the GW 2 receives, from the center 100, the pointer deletion instruction that includes therein the device ID of "A", the TS of "9:43", and the GW ID of "GW1", the pointer processing unit 243 deletes the B pointer of "GW1" indicated by reference numeral 4201 illustrated in FIG. 23. Furthermore, it may also be configured such that, instead of the center 100 sending the pointer deletion instruction to the GW 200, the pointer is deleted after the pointer processing unit 243 has sent the TS to the center 100.

Flow of the Process

Figure 24:
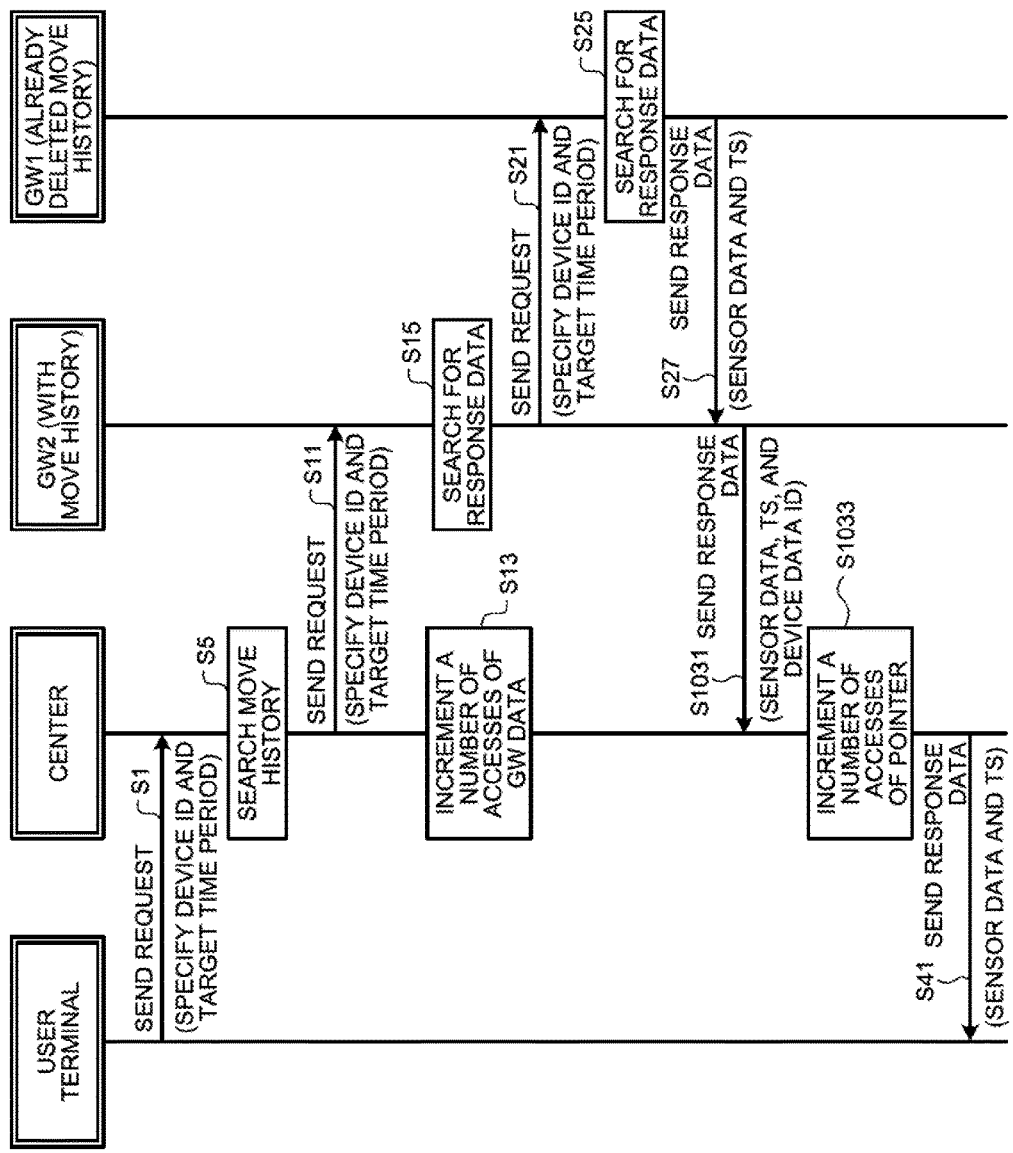
FIG. 24 is a sequence diagram illustrating an example of a request process according to the third embodiment.

In the following, the process performed in the embodiment will be described with reference to FIGS. 24 to 27. FIG. 24 is a sequence diagram illustrating an example of a request process according to the third embodiment. Furthermore, in FIG. 24, because the processes indicated by the same step numbers as those used in FIG. 10 are the same processes illustrated in FIG. 10, the descriptions thereof will be omitted except for the points described below. Furthermore, regarding the move history update process illustrated in FIG. 13 and the move history deletion process illustrated in FIG. 16, the same processes as those performed in the first embodiment are also performed in the third embodiment; therefore, descriptions thereof will be omitted.

The request response unit 242 in the GW 200*b* with the GW ID of "GW2" sends, to the center 100, the response data that includes therein the device data ID that is associated with the pointer used when the request is sent at Step S21 (Step S1031).

The move history processing unit 143 in the center 100 that has received the response data increments the "Np" that is stored in the pointer use frequency DB 132 and that is associated with the received device data ID by 1 (Step S1033).

Figure 25:
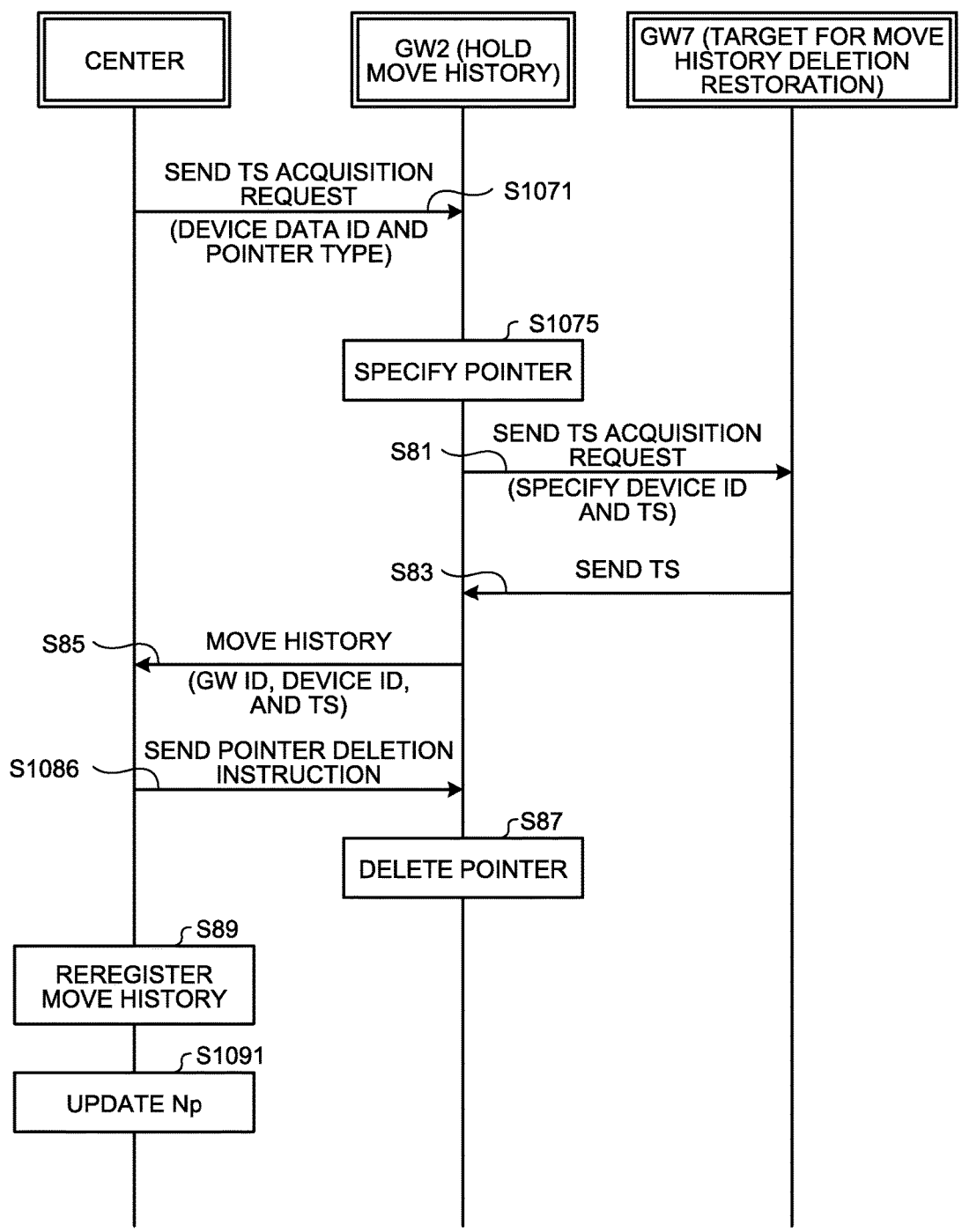
FIG. 25 is a sequence diagram illustrating an example of a move history reregistration process according to the third embodiment.

In the following, the reregistration of the move history according to the embodiment will be described with reference to FIG. 25. FIG. 25 is a sequence diagram illustrating an example of a move history reregistration process according to the third embodiment. Furthermore, in FIG. 25, because the processes indicated by the same step numbers as those used in FIG. 19 are the same processes illustrated in FIG. 19, the descriptions thereof will be omitted except for the points described below.

First, the move history processing unit 143 in the center 100 sends, to the GW 200*b* with the GW ID of "GW2", the TS acquisition request that includes therein the device data ID and the pointer type (Step S1071).

The pointer processing unit 243 in the GW 200*b* that has received the TS acquisition request specifies the pointer associated with the received device data ID and the pointer type (Step S1075). In the embodiment, the pointer processing unit 243 sends the TS acquisition request to the GW 200 with the GW ID of "GW7" that is associated with the specified pointer. Then, after having received the pointer deletion instruction from the center 100 (Step S1086), the pointer processing unit 243 deletes the pointer.

If the move history processing unit 143 in the center 100 receives the move history from the GW 200*b*, the move history processing unit 143 sends the pointer deletion instruction to the GW 200*b* and increments the "Np" stored in the pointer use frequency DB 132 by 1 (Step S1091).

Figure 26:
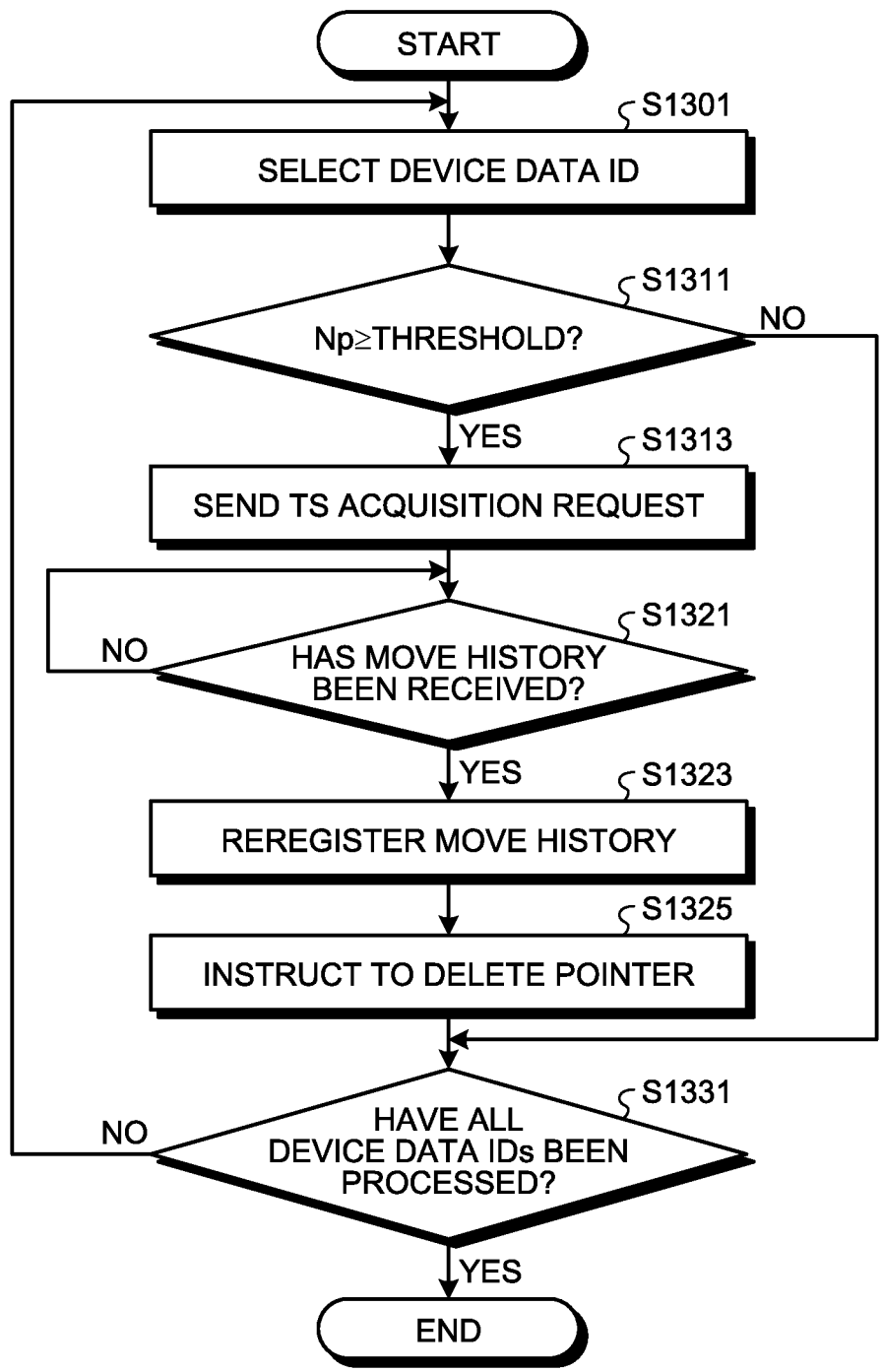
FIG. 26 is a flowchart illustrating an example of a move history reregistration process performed in the center according to the third embodiment.

In the following, the process performed in center 100 from among the move history reregistration processes illustrated in FIG. 25 will be described with reference to FIG. 26. FIG. 26 is a flowchart illustrating an example of a move history reregistration process performed in the center according to the third embodiment. First, the move history processing unit 143 selects the device data ID stored in the pointer use frequency DB 132 (Step S1301). Then, the move history processing unit 143 determines whether the Np that is stored by being associated with the device data ID is equal to or greater than the threshold of the "Np" (Step S1311). If it is determined that the Np is less than the threshold (No at Step S1311), the move history processing unit 143 proceeds to Step S1331.

If the Np is equal to or greater than the threshold (Yes at Step S1311), the move history processing unit 143 refers to the move history DB 131 and specifies the GW 200 associated with the device data ID and sends the TS acquisition request to the GW 200 (Step S1313). Then, the move history processing unit 143 determines whether the move history has been received from the GW 200 (Step S1321). If the move history has not been received (No at Step S1321), the move history processing unit 143 waits until the move history is received.

If the move history processing unit 143 has received the move history from the GW 200 (Yes at Step S1321), the move history processing unit 143 associates the GW ID and the TS that are included in the received move history with the received device ID and reregisters the associated data in the move history DB 131 (Step S1323). Furthermore, the move history processing unit 143 sends the pointer deletion instruction to the GW 200 (Step S1325). Then, the process has been performed, by returning to Step S1301, on the move history processing unit 143 determines whether all of the device data IDs stored in the pointer use frequency DB 132 (Step S1331). If the process has not been performed on all of the device data IDs (No at Step S1331), the move history processing unit 143 repeats the process on all of the unprocessed device data ID. Then, if the move history processing unit 143 completes the process on all of the device data IDs (Yes Step S1331), the move history processing unit 143 ends the process.

Figure 27:
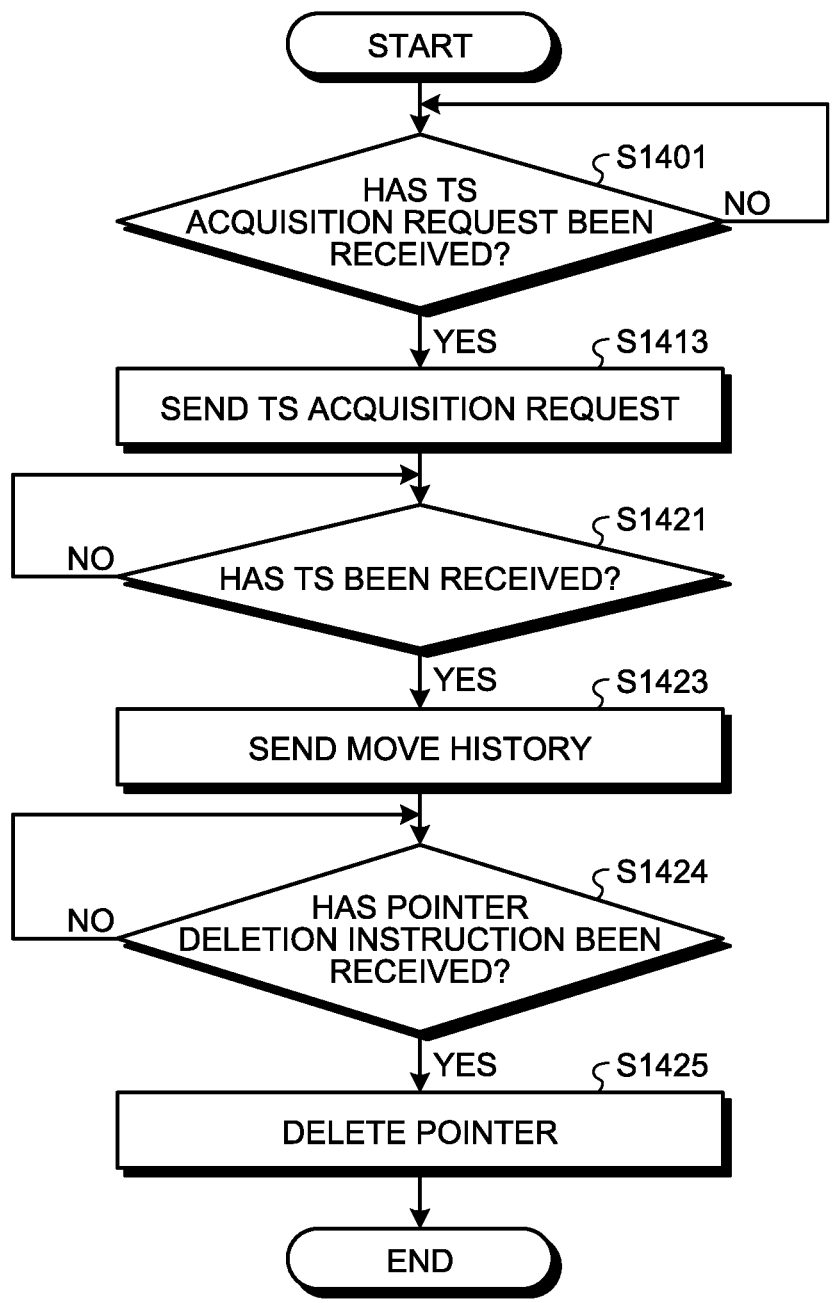
FIG. 27 is a flowchart illustrating an example of a pointer update process in the GW according to the third embodiment.

In the following, the process performed in the GW 200 from among the move history reregistration processes illustrated in FIG. 25 will be described with reference to FIG. 27. FIG. 27 is a flowchart illustrating an example of a pointer update process in the GW according to the third embodiment. First, the pointer processing unit 243 determines whether the TS acquisition request has received from the center 100 (Step S1401). If the pointer processing unit 243 has not received the TS acquisition request (No at Step S1401), the pointer processing unit 243 waits until the pointer processing unit 243 receives the TS acquisition request. If the pointer processing unit 243 receives the TS acquisition request from the center 100 (Yes at Step S1401), the pointer processing unit 243 refers to the device information DB 231, specifies the GW 200, and sends the TS acquisition request (Step S1413). Then, the pointer processing unit 243 determines whether the pointer processing unit 243 has received the TS from the specified GW 200 (Step S1421). If the pointer processing unit 243 has not received the TS (No at Step S1421), the pointer processing unit 243 waits until the pointer processing unit 243 receives the TS.

If the pointer processing unit 243 receives the TS (Yes at Step S1421), the pointer processing unit 243 sends, to the center 100, the received TS, the GW ID of the specified GW 200, and the device ID (Step S1423). Then, the pointer processing unit 243 determines whether the pointer deletion instruction has been received from the center 100 (Step S1424). If the pointer processing unit 243 has not received the pointer deletion instruction (No at Step S1424), the pointer processing unit 243 waits until the pointer processing unit 243 receives the pointer deletion instruction.

If the pointer processing unit 243 receives the pointer deletion instruction (Yes at Step S1424), the pointer processing unit 243 deletes the pointer stored in the device information DB 231 (Step S1425) and ends the process.

Due to the processes described above, in also the configuration in which the number of accesses "Np" to the pointer is stored in the center 100, the GW data can be deleted so as to implement both the maintenance of a response speed of data acquisition and a reduction in storage capacity.

[d] Fourth Embodiment

In the above explanation, a description has been given of the embodiments according to the present invention; however, the present invention may also be implemented with various kinds of embodiments other than the embodiments described above. For example, each of the processes illustrated in FIGS. 10 to 20 and FIGS. 24 to 27 are not limited to the order described above and may also be simultaneously performed or may also be performed by changing the order of the processes as long as the processes do not conflict with each other.

Of the processes described in the embodiments, the whole or a part of the processes that are mentioned as being automatically performed can be manually performed, or the whole or a part of the processes that are mentioned as being manually performed can be automatically performed using known methods. Furthermore, the flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, it may also be possible to use the configuration in which, in the center 100, the determination unit 142 is integrated with the move history processing unit 143. Furthermore, in GW 200, the pointer of the device and the sensor data acquired from the device may also separately be stored in different DBs. Furthermore, all or any part of the processing functions performed by each device can be implemented by a CPU and by programs analyzed and executed by the CPU or implemented as hardware by wired logic.

Data Configuration of the Data Acquisition Request

Furthermore, in each of the embodiments, it may also be configured such that, instead of the device ID, the user terminal 900 sends a data acquisition request that includes therein another kind of information that can be used to specify the device ID in the center 100, such as an address, or the like. Furthermore, with the configuration in which only the single device 500 is included in the data acquisition system 1, it may also be configured such that the user terminal 900 and the center 100 do not specify the device ID in the data acquisition request.

Furthermore, it may also be configured such that the user terminal 900 sends the data acquisition request without specifying the target time period. For example, the user terminal 900 may also send the data acquisition request that includes therein, instead of the target time period, the time at which the sensor data has been acquired. In this case, the center 100 specifies the device ID on the basis of the information received from the user terminal 900 and sends, to each of the GWs 200, the data acquisition request that includes therein the specified device ID and the target time. Furthermore, it may also be configured such that, if the device data that is associated with the same time as the target time is not stored in the device information DB 231, each of the GWs 200 that has received the data acquisition request responds the device data that is associated with the time immediately before or immediately after the target time.

Data Acquisition Using the Pointer

Furthermore, in the example illustrated in FIGS. 6 to 8, the GW ID is stored as the pointer in the device information DB 231; however, the configuration is not limited to this. For example, it may also be configured such that another kind of information that can specify the GW 200 at the access destination, such as the IP address or the MAC address of the GW 200, is stored in the device information DB 231. Furthermore, in also a case in which the GW data is reregistered in the move history DB 131 in the center 100, it may also be configured such that the pointer associated with the GW data is not deleted from the device information DB 231.

Furthermore, it may also be configured such that, if the request processing unit 141 refers to the move history DB 131 illustrated in FIG. 5, the data acquisition request including the time period after "10:02" and before "10:14" is sent to, instead of the GW 200b, the GW 200 with the GW ID of "GW6". Furthermore, it may also be configured such that the request processing unit 141 sends the data acquisition request including the time period after "10:02" and before "10:14" to both the GW 200b and the GW 200 with the GW ID of "GW6". For example, because the GW 200b uses the "F pointer" in the device information DB 231 and because the GW 200 with the GW ID of "GW6" uses the "B pointer" in the device information DB 231, the GW 200 with the GW ID of "GW7" can be specified. Namely, all of the GWs 200 use the respective pointers, whereby the GWs 200 can acquire the sensor data from the GW 200 with the GW ID of "GW7".

Furthermore, it may also be configured such that the device information DB 231 in each of the GWs 200 stores therein one of the F pointer and the B pointer. For example, it may also be configured such that the request processing unit 141 sends the data acquisition request including the time period that is after "10:02" and before "10:14" to only the GW 200b with the GW ID of "GW2" without sending the data acquisition request to the GW 200 with the GW ID of "GW6".

Change in the Target Time Period Included in the Request

Furthermore, it may also be configured such that, when the request response unit 242 transfers the data acquisition request, the target time period included in the received data acquisition request is changed. For example, it may also be configured such that, because the device data after "9:43" is held by the GW 200b, when the request response unit 242 transfers the data acquisition request to the GW 200a, the target time period is changed to the time period that is after "9:35" and before "9:43".

Reregistration of the TS

Furthermore, in the first embodiment, a description has been given of the configuration in which, when the move history processing unit 143 in the center 100 reregisters the GW data on, for example, the GW 200a, the device ID and the TS are received from the GW 200b; however, the embodiment is not limited to this. For example, it may also be configured such that the GW 200a that has received the TS acquisition request from the GW 200b directly sends the device ID and the TS to the center 100 without passing through the GW 200b.

Timing in which the TS is Sent to the Center

Furthermore, in the first embodiment, the configuration in which, if the GW 200 receives the sensor data from the device 500 first, the GW 200 sends the device ID and the TS to the center 100 has been described; however, the embodiment is not limited to this. For example, if the device 500*a* illustrated in FIG. 2 revolves or reciprocates in a predetermined range, there may be a case in which the device 500*a* again accesses the GW 200*a* after having accessing the GW 200*b*. In this case, even if the device 500*a* again accesses the GW 200*a*, because the GW 200*a* has already received the sensor data from the device 500*a*, there may be a case in which the GW 200*a* does not send both the device ID and the TS to the center 100. In this case, in the center 100, there may possibly be a case of not appropriately identifying the GW data.

In such a case, it may also be configured such that, for example, the sensor data acquiring unit 241 in the GW 200*a* sends both the device ID and the TS to the center 100 every time the sensor data acquiring unit 241 receives the sensor data from the device 500*a*. In this case, the move history processing unit 143 in the center 100 registers the GW data in the move history DB 131 only if the latest TS that is stored in the move history DB 131 by being associated with the device ID received from the GW 200*a* is not the TS related to the GW 200*a*. With this configuration, instead of the GW 200, the center 100 determines whether the GW data needs to be registered in the move history DB 131. With this configuration, an amount of the information sent from the GW 200 to the center 100 is increased; however, the GW data can appropriately be registered in the center 100.

Furthermore, it may also be configured such that, when the device 500*a* again sends the sensor data to the GW 200*a* after the device 500*a* has sent the sensor data to the GW 200*b*, the device 500*a* sends the sensor data by associating the sensor data with the GW ID of "GW2" of the GW 200 that is the transmission destination and that has sent the sensor data immediately before. In this case, the sensor data acquiring unit 241 in the GW 200*a* also sends the GW data to the center 100 in also a case in which the sensor data associated with the device ID is received from the device 500*a*, in addition to a case in which the sensor data is received from the device 500*a* first time. With this configuration, instead of the GW 200, the device 500*a* determines whether the GW data needs to be registered in the move history DB 131. With this configuration, the GW data can be appropriately registered in the center 100 while suppressing an increase in information sent from the GW 200 to the center 100.

Hardware Configuration

In the above explanation, a description has been given of each of the embodiments related to the system in the present invention. In the following, an example of the hardware configuration of the center 100 in each of the embodiments will be described. All or any part of the various kinds of processing functions performed by each device may also be executed by a central processing unit (CPU) (or a microcomputer, such as a micro processing unit (MPU) or a micro controller unit (MCU)). Furthermore, all or any part of the various kinds of processing functions may also be, of course, executed by programs analyzed and executed by the CPU (or the microcomputer, such as the MPU or the MCU) or executed by hardware by wired logic. The various kinds of processes described in each of the embodiments can be implemented by programs prepared in advance and executed by a computer. Thus, in the following, an example of a computer that executes programs having the same function as that described in each of the embodiments described above will be described as an example of the hardware configuration.

Figure 28:
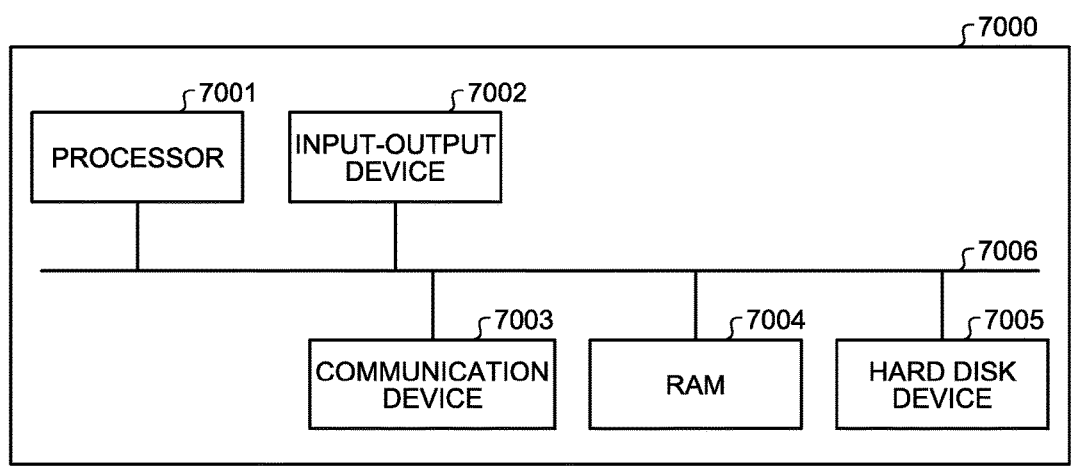
FIG. 28 is a block diagram illustrating the hardware configuration.

FIG. 28 is a block diagram illustrating the hardware configuration. The center 100 can be implemented by the same hardware configuration as that of a computer 7000 illustrated in FIG. 28.

As illustrated in FIG. 28, the computer 7000 includes a processor 7001 that executes various kinds of arithmetic processing, an input-output device 7002, and a communication device 7003 that is used to connect the user terminal 900 and the GW 200 in a wireless or wired manner. Furthermore, the computer 7000 includes a RAM 7004 that temporarily stores therein various kinds of information and a hard disk device 7005. Furthermore, each of the devices 7001 to 7005 is connected to a bus 7006.

The hard disk device 7005 stores therein a data management program having the same function as that performed by each of the processing units, i.e., the request processing unit 141, the determination unit 142, and the move history processing unit 143 described above in each of the embodiment. Furthermore, the hard disk device 7005 stores therein the move history DB 131 and the pointer use frequency DB 132. The hard disk device 7005 stores therein various kinds of data that implements the data management program.

The processor 7001 reads each of the programs stored in the hard disk device 7005 and loads the programs in the RAM 7004, thereby performing various kinds of processes. Furthermore, these programs allow the computer 7000 to function as the request processing unit 141, the determination unit 142, and the move history processing unit 143 described above in each of the embodiments. Furthermore, each of the programs described above does not always need to be stored in the hard disk device 7005. For example, the computer 7000 may also read and execute the programs stored in a storage medium that can be read by the computer 7000.

According an aspect of an embodiment of the present invention, it is possible to implement the maintenance of a response speed of data acquisition and a reduction in storage capacity.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data management method performed by a data management system that includes a plurality of relay devices and a management device, the data management method comprising:

registering, in a storage performed by a processor of the management device, when a connection notification is received from the relay device, from among the plurality of the relay devices, that is connected to a device that collects data, identification information that identifies the relay device that corresponds to the request destination when the data is acquired;

sending, performed by the processor of the management device, when the data is acquired, an acquisition request for the data to the relay device that is specified by the identification information;

sending, performed by the processor of the management device, to one of the plurality of the relay devices, the identification information, from among a plurality of pieces of the identification information associated with the plurality of the relay devices, that is targeted for deletion and that is to be deleted from the storage;

storing, in the storage performed by a processor of each of the plurality of the relay devices, the data collected by the device;

registering, in the storage performed by the processor of each of the plurality of the relay devices, when the identification information targeted for the deletion is received, inquiry destination information that specifies the relay device targeted for the deletion by associating the inquiry destination information with the data; and executing, performed by the processor of each of the plurality of the relay devices, when the acquisition request for the data is received from the management device, response control of the data on the basis of the determination of whether the inquiry destination information is associated with the data in the storage.

2. The data management method according to claim 1, wherein the registering performed by the processor of the management device includes, when the connection notification that includes therein the time at which the device is connected is received, associating the identification information that identifies the relay devices with the time and registering the associated identification information and the time in the storage in the order of the time, the sending the acquisition request performed by the processor of the management device includes sending, to the relay device associated with the time included in a time period of the data targeted for acquisition, the acquisition request for the data specified by the time period, and the executing the response control performed by the processor of each of the plurality of the relay devices includes sending, when the inquiry destination information is not associated with the data that is included in the time period specified by the acquisition request for the data, the data stored in the storage to the management device and transferring, when the inquiry destination information is associated with the data, the acquisition request for the data to the relay device specified by the inquiry destination information.

3. The data management method according to claim 2, wherein the sending the identification information performed by the processor of the management device includes sending, to a first relay device that has sent the connection notification at the time before the time at which the relay device targeted for the deletion has sent the connection notification, the identification information targeted for the deletion, and the registering performed by the processor of each of the plurality of the relay devices includes registering, in the storage when the identification information targeted for the deletion is received, the inquiry destination information as pointer information with respect to the relay device that holds the data acquired at the later acquisition time.

4. The data management method according to claim 3, wherein the sending the identification information performed by the processor of the management device includes sending, to a second relay device that has sent the connection notification at the time after the time at which the relay device targeted for the deletion has sent the connection notification, the identification information targeted for the deletion, and the registering performed by the processor of each of the plurality of the relay devices includes registering, in the storage when the identification information targeted for the deletion is received, the inquiry destination information as pointer information with respect to the relay device that holds the data acquired at the earlier data acquisition time.

5. The data management method according to claim 1, wherein the sending the identification information performed by the processor of the management device includes specifying, when a reference frequency of the identification information stored in the storage is less than a threshold, the identification information as the identification information targeted for the deletion.

6. The data management method according to claim 1, wherein the sending the identification information performed by the processor of the management device includes specifying, as the identification information targeted for the deletion, the identification information on the relay device in which a hop count from the relay device that is associated with another identification information stored in the storage is less than a threshold.

7. The data management method according to claim 1, wherein the registering performed by the processor of the management device includes reregistering, when the number of transfers of the acquisition request for the data with respect to a transfer destination relay device that is associated with the inquiry destination information is equal to or greater than a threshold, the identification information on the transfer destination relay device in the storage.

8. The data management method according to claim 7, further comprising:

sending, performed by the processor of each of the plurality of the relay devices, when the number of transfers of the acquisition request for the data with respect to the transfer destination relay device is equal to or greater than the threshold, an instruction to send the identification information to the transfer destination relay device; and deleting, performed by the processor of each of the plurality of the relay devices, when the identification information that is sent by the transfer destination relay device to the storage in the management device is reregistered, the inquiry destination information associated with the transfer destination relay device.

9. The data management method according to claim 7, further comprising:

acquiring, from a transfer source relay device that stores therein the inquiry destination information performed by the processor of the management device, the number of transfers of the acquisition request for the data to the transfer destination relay device;

sending, performed by the processor of the management device, when the number of transfers is equal to or greater than the threshold, the instruction to send the identification information on the transfer destination relay device to the transfer source relay device; and reregistering, performed by the processor of the management device, when the identification information on the transfer destination relay device is received, the received identification information in the storage and sending, performed by the processor of the management device, an instruction to delete the inquiry destination information to the transfer source relay device.

10. The data management method according to claim 1, wherein the executing the response control performed by the processor of each of the plurality of the relay devices includes acquiring, from the transfer destination relay device associated with the inquiry destination information, the data associated with the acquisition request for the transferred data and sending, performed by the processor of each of the plurality of relay devices, both the acquired data and the data stored in the storage to the management device.

11. The data management method according to claim 1, wherein
the registering performed by the processor of the management device includes storing the identification information in the storage for each of the pieces of the device identification information that identifies the plurality of the devices,
the sending the identification information performed by the processor of the management device includes sending, to one of the relay devices when the identification information that is associated with the device identification information associated with a predetermined device is deleted, a combination of the identification information targeted for the deletion and the device identification information,
the registering performed by the processor of each of the plurality of the relay devices includes associating, when the combination is received, registering the inquiry destination information that specifies the relay device targeted for the deletion in the storage by associating the inquiry destination information with the device identification information, and
the executing the response control performed by the processor of each of the plurality of the relay devices includes sending, when the inquiry destination information is not registered in the storage by being associated with the device identification information that is included in the acquisition request for the data, the data to the management device and transferring, when the inquiry destination information is registered in the storage by being associated with the device identification information, the acquisition request that includes the device identification information to the relay device that is specified by the inquiry destination information.

12. A data management system comprising:
a plurality of relay devices; and
a management device, wherein
the management device includes
    a memory; and
    a processor that is connected to the memory, wherein the processor executes a process including:
        registering, in a storage when a connection notification is received from a relay device, from among a plurality of relay devices, that is connected to a device that collects data, identification information that identifies the relay device that corresponds to the request destination when the data is acquired,
        sending, when the data is acquired, an acquisition request for the data to the relay device that is specified by the identification information, and
        sending to one of the plurality of the relay devices, the identification information, from among a plurality of pieces of the identification information associated with the plurality of the relay devices, that is targeted for deletion and that is to be deleted from the storage, and
each of the plurality of the relay devices includes
    a memory; and
    a processor that is connected to the memory, wherein the processor executes a process including:
        storing, in the storage unit, the data collected by the device,
        registering, in the storage unit, when the identification information targeted for the deletion is received, inquiry destination information that specifies the relay device targeted for the deletion by associating the inquiry destination information with the data, and
        executing, when the acquisition request for the data is received from the management device, response control of the data on the basis of the determination of whether the inquiry destination information is associated with the data in the storage.

* * * * *